United States Patent
Jiang

(10) Patent No.: US 12,202,920 B2
(45) Date of Patent: Jan. 21, 2025

(54) OLEFIN POLYMERIZATION PROCESSES FEATURING IN SITU BLENDING OF AN OIL EXTENSION

(71) Applicant: ExxonMobil Chemical Patents Inc., Baytown, TX (US)

(72) Inventor: Peijun Jiang, Katy, TX (US)

(73) Assignee: ExxonMobil Engineering & Technology Company, Baytown, TX (US)

( * ) Notice: Subject to any disclaimer, the term of this patent is extended or adjusted under 35 U.S.C. 154(b) by 686 days.

(21) Appl. No.: 17/311,795

(22) PCT Filed: Jan. 7, 2020

(86) PCT No.: PCT/US2020/012567
§ 371 (c)(1),
(2) Date: Jun. 8, 2021

(87) PCT Pub. No.: WO2020/146375
PCT Pub. Date: Jul. 16, 2020

(65) Prior Publication Data
US 2022/0033549 A1 Feb. 3, 2022

Related U.S. Application Data

(60) Provisional application No. 62/789,766, filed on Jan. 8, 2019.

(51) Int. Cl.
*C08F 210/18* (2006.01)
*C08F 4/6592* (2006.01)
*C08F 210/16* (2006.01)
*C08F 4/64* (2006.01)

(52) U.S. Cl.
CPC .......... *C08F 210/18* (2013.01); *C08F 210/16* (2013.01); *C08F 4/64044* (2013.01); *C08F 4/64055* (2013.01); *C08F 4/64089* (2013.01); *C08F 4/64148* (2013.01); *C08F 4/64193* (2013.01); *C08F 4/65922* (2013.01); *C08F 2500/05* (2013.01)

(58) Field of Classification Search
CPC .. C08F 210/18; C08F 210/16; C08F 2500/05; C08F 2500/17; C08F 4/65922; C08F 4/64089; C08F 4/64148; C08F 4/6044; C08F 4/64055; C08F 4/64193; C08L 23/16; C08L 2205/025
See application file for complete search history.

(56) References Cited

U.S. PATENT DOCUMENTS

| | | | |
|---|---|---|---|
| 5,041,584 A | 8/1991 | Crapo et al. | |
| 5,153,157 A | 10/1992 | Hlatky et al. | |
| 5,447,895 A | 9/1995 | Marks et al. | |
| 5,453,410 A | 9/1995 | Kolthammer et al. | |
| 5,942,459 A | 8/1999 | Sugano et al. | |
| 6,194,341 B1 * | 2/2001 | Canich | C08F 10/00 526/170 |
| 6,211,105 B1 | 4/2001 | Holtcamp | |
| 6,248,845 B1 * | 6/2001 | Loveday | C08F 210/16 526/901 |
| 6,255,414 B1 * | 7/2001 | Ittel | C08F 10/00 526/346 |
| 6,262,196 B1 * | 7/2001 | Mecking | C08F 10/00 526/160 |
| 6,340,730 B1 * | 1/2002 | Murray | C07F 7/00 502/155 |
| 6,465,386 B1 * | 10/2002 | Maddox | C08F 10/00 502/155 |
| 6,525,157 B2 | 2/2003 | Cozewith et al. | |
| 6,555,632 B1 | 4/2003 | Zandona | |

(Continued)

FOREIGN PATENT DOCUMENTS

| | | |
|---|---|---|
| EP | 0930337 | 7/1999 |
| EP | 1519967 | 4/2005 |

(Continued)

OTHER PUBLICATIONS

Karbach, F.F.; Macko, T.; Duchateau, R. Macromolecules 2016, 49, 1229-1241. (Year: 2016).*
H. Makio, et al., "Development and Application of FI Catalysts for Olefin Polymerization: Unique Catalysis and Distinctive Polymer Formation," Accounts of Chemical Research, 2009, 42, pp. 1532-1544.
G.S. Girolami, "A 'Simple Back of the Envelope' Method for Estimating the Densities and Molecular Volumes of Liquids and Solids," Journal of Chemical Education, 1994, pp. 962-964, 71.

(Continued)

*Primary Examiner* — Rip A Lee

(57) ABSTRACT

High molecular weight elastomers, such as ethylene-propylene-diene monomer (EPDM) polymers, are conventionally formulated with a post-polymerization oil extension to mitigate their high Mooney viscosity. Post-polymerization oil extension adds to processing costs and precludes use of polymerization facilities lacking oil extension capabilities. A low molecular weight polymer may be co-produced with a high molecular weight elastomer containing the same monomers, where the low molecular weight polymer may function in place of conventional oil extension. Polymerization methods may comprise: combining one or more olefinic monomers, a metallocene first catalyst component and a non-metallocene transition metal second catalyst component, and a solvent; and reacting the one or more olefinic monomers under solution polymerization conditions to form a polyolefin blend comprising first and second polyolefins having a bimodal molecular weight distribution. The non-metallocene second catalyst component may be a pyridyl-bisimine, quinolinyldiamido, pyridylamido, phenoxyimine, or bridged bi-aromatic complex.

21 Claims, 3 Drawing Sheets

(56) References Cited

U.S. PATENT DOCUMENTS

| | | | |
|---|---|---|---|
| 6,608,140 B2* | 8/2003 | Christie | C08L 23/04 |
| | | | 525/240 |
| 6,620,896 B1* | 9/2003 | Killian | C08F 110/02 |
| | | | 526/169.1 |
| 6,686,306 B2* | 2/2004 | Shih | C08F 10/00 |
| | | | 526/170 |
| 6,716,931 B2 | 4/2004 | Koshiba et al. | |
| 6,750,284 B1 | 6/2004 | Dharmarajan et al. | |
| 6,828,395 B1 | 12/2004 | Ehrman et al. | |
| 6,870,015 B2* | 3/2005 | Oshima | C08F 210/16 |
| | | | 526/943 |
| 6,953,828 B2 | 10/2005 | Dharmarajan et al. | |
| 7,087,686 B2 | 8/2006 | Britovsek et al. | |
| 7,087,690 B2 | 8/2006 | Boussie et al. | |
| 7,091,292 B2 | 8/2006 | Boussie et al. | |
| 7,132,328 B2* | 11/2006 | Joo | H01L 29/40114 |
| | | | 438/257 |
| 7,193,017 B2 | 3/2007 | Kwalk | |
| 7,410,926 B2* | 8/2008 | Kao | C08F 10/00 |
| | | | 502/118 |
| 7,666,491 B2 | 2/2010 | Yang et al. | |
| 7,666,959 B2* | 2/2010 | Razavi | C08F 10/00 |
| | | | 502/103 |
| 7,927,695 B2 | 4/2011 | Raulie | |
| 7,973,116 B2 | 7/2011 | Hagadorn et al. | |
| 8,058,373 B2 | 11/2011 | Stevens et al. | |
| 8,404,880 B2 | 3/2013 | Kaji et al. | |
| 8,435,914 B2* | 5/2013 | Kao | C08F 10/00 |
| | | | 526/943 |
| 8,658,556 B2 | 2/2014 | Stewart | |
| 8,722,833 B2* | 5/2014 | Kipke | C08L 23/04 |
| | | | 525/240 |
| 8,742,039 B2* | 6/2014 | Davis | C08F 10/00 |
| | | | 525/240 |
| 8,835,577 B2* | 9/2014 | Rix | C08F 10/00 |
| | | | 526/348 |
| 8,957,158 B2* | 2/2015 | Fantinel | C08L 23/0815 |
| | | | 526/348 |
| 8,975,209 B2 | 3/2015 | Kaji et al. | |
| 8,999,875 B2* | 4/2015 | Fantinel | C08L 23/0815 |
| | | | 502/103 |
| 9,102,773 B2 | 8/2015 | Hagadorn et al. | |
| 9,340,630 B2 | 5/2016 | Kaji et al. | |
| 9,580,584 B2* | 2/2017 | Hoecker | C08F 210/16 |
| 10,208,140 B2* | 2/2019 | Hagadorn | C08F 10/06 |
| 10,414,140 B2 | 9/2019 | Zacarias et al. | |
| 10,626,200 B2* | 4/2020 | Hagadorn | C08F 4/65912 |
| 10,669,414 B2 | 6/2020 | Li et al. | |
| 10,961,331 B2* | 3/2021 | Small | C08F 4/7034 |
| 11,008,449 B2* | 5/2021 | Tsou | C08F 210/18 |
| 11,041,034 B2* | 6/2021 | Atienza | C08F 210/16 |
| 11,390,733 B2* | 7/2022 | Dharmarajan | C08L 23/16 |
| 11,466,149 B2* | 10/2022 | Tsou | C08J 3/24 |
| 11,859,032 B2* | 1/2024 | Atienza | C08F 210/16 |
| 2007/0208139 A1 | 9/2007 | Raulie et al. | |
| 2010/0255739 A1 | 10/2010 | Black et al. | |
| 2011/0212315 A1* | 9/2011 | Fantinel | C08F 10/00 |
| | | | 526/348 |
| 2018/0002352 A1 | 1/2018 | Hagadorn et al. | |
| 2018/0044513 A1 | 2/2018 | Tsou et al. | |
| 2018/0208757 A1 | 7/2018 | Jiang et al. | |
| 2019/0177449 A1* | 6/2019 | Hagadorn | C08F 10/02 |

FOREIGN PATENT DOCUMENTS

| | | | |
|---|---|---|---|
| EP | 1764390 | 3/2007 | |
| EP | 2 003 166 A1 * | 12/2008 | C08L 23/08 |
| EP | 2003166 | 12/2008 | |
| KR | 20110015737 A * | 2/2011 | C08F 10/00 |
| WO | 94/07928 | 4/1994 | |
| WO | 95/14044 | 5/1995 | |
| WO | 2001/30861 | 5/2001 | |
| WO | 2003/020806 | 3/2003 | |
| WO | 2017/082999 | 5/2017 | |
| WO | 2017/105550 | 6/2017 | |
| WO | 2018/005201 | 1/2018 | |
| WO | 2019/099116 | 5/2019 | |
| WO | WO-2019173129 A1 * | 9/2019 | C08F 297/02 |

OTHER PUBLICATIONS

W. Cheung et al., "Structure-Property Relationships and Applications of Novel Flexible TPO Based On Blends OF Developmental Performance Elastomer and Polypropylene", SPE ANTEC 2004, pp. 2600-2605.

T. Sun, et al., "Effect of Short Chain Branching on the Coil Dimensions of Polyolefins in Dilute Solution," Macromolecules, 2001, pp. 6812-6820, 34.

"Light Scattering from Polymer Solutions," M.B. Huglin, ed., 1972, Academic Press.

L.M. Wheeler, et al., "Gel Permeation Chromatography/Fourier Transform Infrared Interface for Polymer Analysis," Applied Spectroscopy, 1993, pp. 1128-1130, 47.

"Polymer Handbook," 4th Ed., 1999, John Wiley and Sons, New York.

* cited by examiner

OLEFIN POLYMERIZATION PROCESSES FEATURING IN SITU BLENDING OF AN OIL EXTENSION

CROSS-REFERENCE TO RELATED APPLICATIONS

This application is a U.S. national phase application of PCT Application No. PCT/US2020/012567 having a filing date of Jan. 7, 2020, which claims priority to and the benefit of U.S. Provisional Application Ser. No. 62/789,766 having a filing date of Jan. 8, 2019, the contents of each of which are incorporated by reference in their entirety.

FIELD

The present disclosure relates to solution polymerization reactions conducted in a single reactor vessel in the presence of at least two different types of polymerization catalysts.

BACKGROUND

A number of catalysts have been developed for synthesizing polyolefins. The choice of catalyst may aid in tailoring various polyolefin properties, such as molecular weight, branching, tacticity, crystallinity, and similar features. Some catalysts suitable for polymerizing olefins are multi-site catalysts, such as traditional Ziegler-Natta catalysts (e.g., $TiCl_4$/triethylaluminum and similar catalysts). Ziegler-Natta catalysts and similar types of polymerization catalysts typically form polyolefins having a relatively wide molecular weight distribution. Metallocene catalysts, in contrast, while functioning in a mechanistically related manner to Ziegler-Natta catalysts, are usually catalytically active at only a single site and typically form polyolefins exhibiting a narrower molecular weight distribution.

Rheological properties and other performance factors of a polyolefin may be altered by blending with various additives. For example, high molecular weight polyolefins, such as ethylene-propylene-diene monomer (EPDM) polyolefin elastomers, may be blended with an oil extension to facilitate processing and lower costs. Conventionally, high molecular weight polyolefin elastomers, such as EPDM, are synthesized first, following by post-polymerization blending of the oil extension into the reaction product obtained from the reactor. Typical oils used for oil extensions include paraffinic hydrocarbons having a molecular weight of around 10,000 or less, for example, which have a high affinity for EPDM and related polyolefins. For EPDM, typical levels of the oil extension may be in a range sufficient to reduce the apparent viscosity to a Mooney viscosity of about 100 or below. For high resilience applications, EPDM typically may contain from about 50 to about 125 phr (parts per hundred of rubber) of the oil extension. Oil extension is also a feature that is oftentimes demanded by industrial mixing operations to facilitate fast processing and mixing of EPDM.

Oil extension has been widely adopted in the rubber industry when high molecular weight thermoplastics such as thermoplastic vulcanizates are in use. For example, EP 0930337 discloses a thermoplastic elastomer composition prepared by dynamically treating a polymer composition comprising an oil-extended ethylene based copolymer rubber, which has an intrinsic viscosity in the range of about 4.3 to 6.8 dl/g when measured at 135° C. in decalin and mineral oil softening agent. In U.S. Pat. No. 6,716,931 oil extended EPDM having a polydispersity index of 3 to 5 is mentioned for dynamic vulcanization applications. Vulcanizates made from such polymers having a broad molecular weight distribution may feature the drawback of a high number of free dangling chain ends that may compromise the dynamic properties. EP1444295 provides EPDM rubbers for use in dynamic applications, which exhibit a good balance between high mechanical strength and high dynamic fatigue strength. The EPDM rubbers described therein may comprise a high molecular weight EPDM with a broad molecular weight distribution, about 20 to about 50 phr of an extension oil, about 10 to about 80 phr of a carbon black and a cure system comprising sulfur, tetramethylthiuram disulfide (TMTD) and 2-mercaptobenzothiazole (MBT).

Post-polymerization blending of an oil extension into EPDM and similar polyolefin elastomers can be problematic in certain instances. Oil introduction typically takes place after the reactor but before the removal of volatiles, such as before a steam stripper, for example. To achieve good mixing, the oil extension is often blended with the EPDM while the polymer is still dissolved or suspended in the reaction media exiting from the reactor used for polymerization. This approach adds an extra step to manufacturing and leaves the choice of a particular oil extension to the polymer manufacturer, not a rubber article manufacturer who uses the polymer subsequently. Additional hardware is also often necessary for introducing a post-reactor oil extension. Since the high molecular weight polyolefin elastomer is initially synthesized without the oil extension in most instances, the viscosity of the polymerization medium may be so high that the polymerization reaction itself is detrimentally impacted, in addition to making downstream processing problematic. In order to facilitate polymerization reactions to form high molecular weight polyolefin elastomers, low cement loadings (total amount of polyolefin to be formed during polymerization) may be used. Polymerization facilities lacking a coupled oil extension facility may be unable to produce high molecular weight polyolefin elastomers, such as EPDM and similar polyolefin elastomers. As a result, production of high molecular weight polyolefin elastomers remains somewhat problematic and expensive as a result of the need to employ post-polymerization oil extension to promote downstream processing.

SUMMARY

In various embodiments, the present disclosure provides methods for synthesizing polyolefin blends, which may exhibit elastomeric properties. The methods comprise: combining a reaction mixture comprising one or more olefinic monomers, a first catalyst component comprising a metallocene, a second catalyst component that is not a metallocene, and a solvent; and reacting the one or more olefinic monomers under solution polymerization conditions to form a polyolefin blend comprising a first polyolefin and a second polyolefin, the polyolefin blend exhibiting a bimodal molecular weight distribution and the second polyolefin having a higher molecular weight than the first polyolefin. The second catalyst component comprises at least one non-metallocene transition metal complex selected from the group consisting of a pyridylbisimine complex, a quinolinyldiamido complex, a pyridylamido complex, a phenoxyimine complex, a bridged bi-aromatic complex, and any combination thereof. In some embodiments, the reaction mixture may be combined and undergo polymerization in a single reactor vessel.

Compositions of the present disclosure may comprise: a polyolefin blend comprising a first polyolefin and a second polyolefin, in which the polyolefin blend exhibits a bimodal molecular weight distribution and the second polyolefin has a higher molecular weight than the first polyolefin. The second polyolefin has a weight average molecular weight of about 150,000 or higher and the first polyolefin has a weight average molecular weight of about 50,000 or lower. The polyolefin blend has a Mooney viscosity of about 50 MU or higher, as measured using a Mooney viscometer. The Mooney viscosity may be measured using modified ASTM D-1646 analysis methods, as described in the examples below.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

Figure 1:
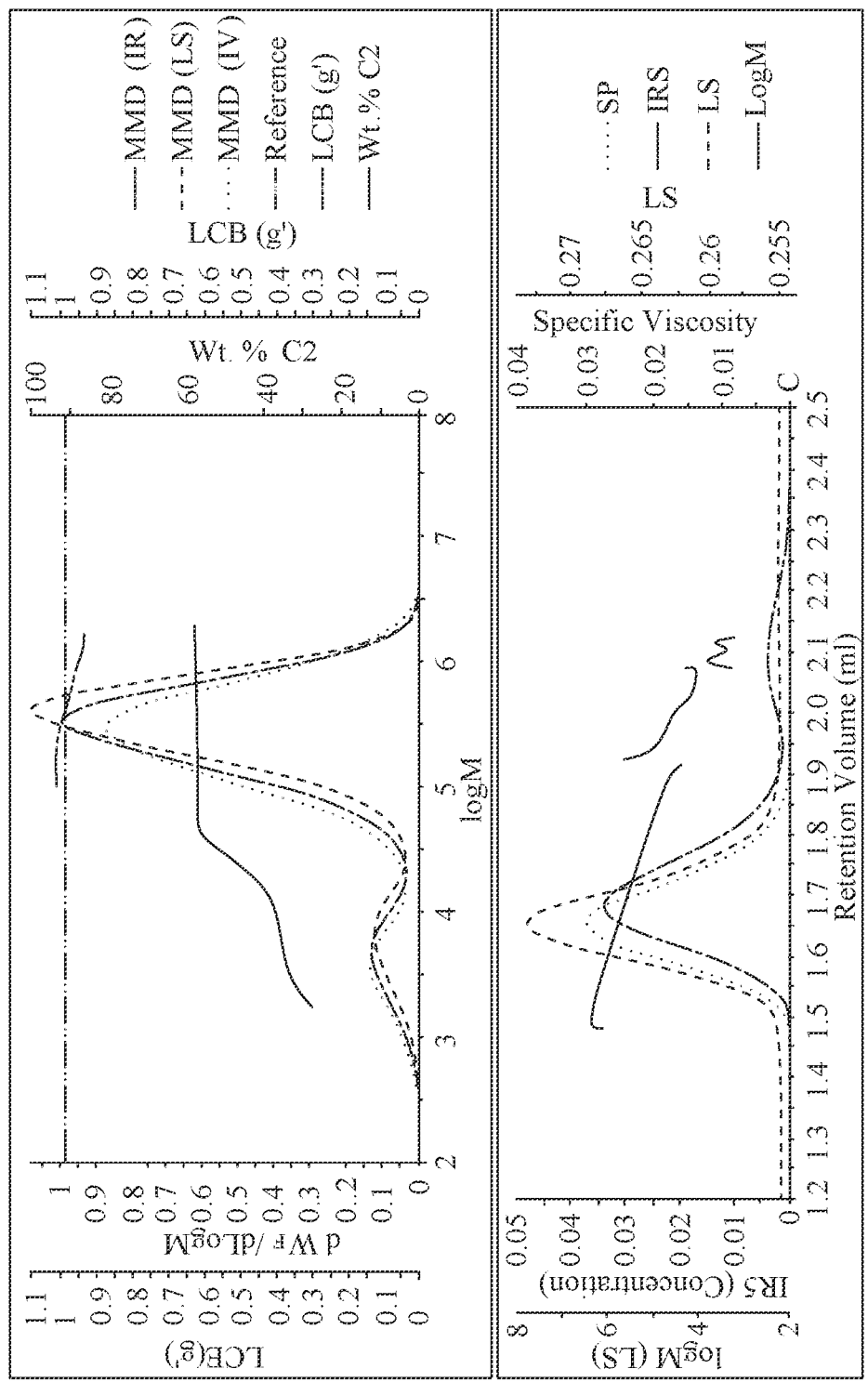
FIG. 1 shows a GPC 4D analysis of Polyolefin Blend 2 produced in the Examples.

The present disclosure generally relates to polymerization and, more specifically, to olefin polymerization reactions conducted in the presence of at least two different types of polymerization catalysts.

As discussed above, high molecular weight polyolefin elastomers are conventionally blended post-polymerization with an oil extension in order to facilitate downstream processing. The material cost of oil extension and its associated capital equipment may raise the expense of producing certain polymers more than would otherwise be desirable, such as ethylene-propylene and ethylene-propylene-diene monomer high molecular weight polyolefin elastomers.

Conventional oil extension substances are paraffinic hydrocarbons having a molecular weight of about 10,000 or under. The present disclosure provides polyolefin elastomers having a replacement for conventional oil extension substances, which may provide a number of advantages as discussed further herein. In particular, the present disclosure demonstrates that a low molecular weight polyolefin may be used in place of a conventional paraffinic hydrocarbon oil extension, thereby providing a polyolefin blend with rheological properties that are at least comparable to those of an oil-extended high molecular weight polyolefin elastomer lacking the low molecular weight polyolefin. The polyolefin blends produced according to the present disclosure may have a bimodal molecular weight distribution, in which the high molecular weight polyolefin (the polyolefin elastomer) is a majority component and the low molecular weight polyolefin (an oil extension replacement) is a minority component. The low molecular weight polyolefin may be present in an amount suitable to convey a desired rheological profile to the polyolefin blend and/or to facilitate downstream processing of the polyolefin blend. Suitable low molecular weight polyolefins and methods for production thereof are described in further detail below.

The benefits described herein may be realized by combining a low molecular weight polyolefin with a high molecular weight polyolefin elastomer at any point during or following production of the high molecular weight polyolefin elastomer. Advantageously, however, the low molecular weight polyolefin and the high molecular weight polyolefin elastomer may be co-produced with one another in a single reactor vessel to provide beneficial in situ blending and polymerization in a low-viscosity polymerization medium. As discussed herein, two different types of polymerization catalysts may be utilized in a single reactor vessel to co-produce a high molecular weight polyolefin elastomer and a low molecular weight polyolefin suitable for replacing the function of an oil extension within the high molecular weight polyolefin elastomer. The low molecular weight polyolefin is produced by a first catalyst and the high molecular weight polyolefin elastomer is produced by a second catalyst. Particular classes of olefin polymerization catalysts that may surprisingly function under the same reactor conditions and solvents to form a low molecular weight polyolefin and a high molecular weight polyolefin elastomer are provided herein.

Co-producing the low molecular weight polyolefin and the high molecular weight polyolefin elastomer in a single polymerization process, possibly within a single reactor vessel, may advantageously facilitate processing of the high molecular weight polyolefin elastomer. Blending of the low molecular weight polyolefin with the high molecular weight polyolefin elastomer may occur more readily in situ during co-production of the two polymers compared to that attainable through post-polymerization blending. Moreover, co-production of the low molecular weight polyolefin and the high molecular weight polyolefin elastomer according to the disclosure herein may advantageously allow polymerization facilities lacking an oil extension facility to produce high molecular weight polyolefin elastomers suitable for further processing. In addition, higher amounts of polymer may be made within a given reactor volume by co-producing a low molecular weight polyolefin as an in situ oil extension according to the disclosure herein. Thus, the present disclosure provides facile methods for producing and further processing high molecular weight polyolefin elastomers, which may exhibit high Mooney viscosity values suitable for use in various applications.

As a further advantage, the polyolefin blends produced according to the present disclosure may exhibit rheological properties that are at least comparable to those of the corresponding high molecular weight polyolefin elastomers processed alone with conventional oil extension. In fact, some polyolefin blends of the present disclosure may exhibit superior rheological performance over the corresponding high molecular weight polyolefin elastomers processed alone with a conventional oil extension. Thus, the polyolefin blends produced according to the disclosure herein are believed to differ both compositionally and functionally from conventional oil-extended high molecular weight polyolefin elastomers.

Finally, the polymerization methods disclosed herein may be further tailored by varying the relative amounts of the two different types of polymerization catalysts. For example, when production of a polyolefin blend having a greater amount of oil extension (low molecular weight polyolefin herein) is desired, the amount of the catalyst suitable for producing the low molecular weight polyolefin may be increased. Conversely, if less oil extension is desired, the amount of the catalyst suitable for producing the low molecular weight polyolefin may be decreased or the amount of the catalyst suitable for producing the high molecular weight polyolefin elastomer may be increased. Thus, the relative amounts of the two different types of polymerization catalysts may be varied in order to provide a polyolefin blend having a desired Mooney viscosity.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 25° C.

As used in the present disclosure, the singular forms "a," "an," and "the" include plural forms unless the context clearly dictates otherwise.

As used herein, Mn is number average molecular weight, Mw is weight average molecular weight, and Mz is z average molecular weight, wt. % is weight percent, and mol. % is mole percent. Molecular weight distribution (MWD), also referred to as polydispersity index (PDI), is defined to be Mw divided by Mn. Unless otherwise noted, all molecular weights (e.g., Mw, Mn, Mz) are in units of g/mol. Measurement techniques for polyolefins and polyolefin blends of the present disclosure are discussed further herein below.

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides). Under this scheme, Ti, Hf and Zr are Group 4 metals.

The term "transition metal" refers to any atom from Groups 3-12 of the Periodic Table, inclusive of the lanthanides and actinide elements.

The term "hydrocarbon" refers to a class of compounds of hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "Cn" refers to hydrocarbon(s) or a hydrocarbyl group having n carbon atom(s) per molecule or group, wherein n is a positive integer. Such hydrocarbon compounds and hydrocarbyl groups may be one or more of linear, branched, cyclic, acyclic, saturated, unsaturated, aliphatic, or aromatic.

The term "hydrocarbyl group" refers to any $C_1$-$C_{100}$ hydrocarbon group bearing at least one unfilled valence position when removed from a parent compound. Hydrocarbyl groups may be optionally substituted, in which the term "optionally substituted" refers to the possible replacement of at least one hydrogen atom or at least one carbon atom of a hydrocarbyl group with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted hydrocarbyl groups include, but are not limited to, functional groups such as O, S, S=O, $S(=O)_2$, $NO_2$, F, Cl, Br, I, $NR_2$, OR, SeR, TeR, $PR_2$, $AsR_2$, $SbR_2$, SR, $BR_2$, $SiR_3$, $GeR_3$, $SnR_3$, $PbR_3$, where R is a hydrocarbyl group or H. Suitable hydrocarbyl R groups may include alkyl, alkenyl, alkynyl, aryl, heteroaryl, cycloalkyl, heterocyclyl, and the like, any of which may be optionally substituted.

Suitable "hydrocarbyl" and "hydrocarbyl groups" may be optionally substituted. The term "hydrocarbyl group having 1 to about 20 carbon atoms" refers to an optionally substituted moiety selected from a linear or branched $C_1$-$C_{20}$ alkyl, a $C_3$-$C_{20}$ cycloalkyl, a $C_6$-$C_{20}$ aryl, a $C_2$-$C_{20}$ heteroaryl, a $C_1$-$C_{20}$ alkylaryl, a $C_7$-$C_{20}$ arylalkyl, and any combinations thereof.

As used in the present disclosure, Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, and MAO is methylalumoxane.

The term "substituted" means that a hydrogen atom or a carbon atom of a hydrocarbon or hydrocarbyl group has been replaced with a heteroatom or a heteroatom functional group, including those noted above.

The term "optionally substituted" means that a hydrocarbon or a hydrocarbyl group may be unsubstituted or substituted (e.g., have at least one hydrogen atom or carbon atom replaced with a heteroatom or heteroatom functional group). For example, the term "optionally substituted hydrocarbyl" refers to replacement of at least one hydrogen atom or carbon atom in a hydrocarbyl group with a heteroatom or heteroatom functional group.

The terms "saturated" or "saturated hydrocarbon" refer to a hydrocarbon or hydrocarbyl group in which all carbon atoms are bonded to four other atoms or bonded to three other atoms with one unfilled valence position thereon.

The terms "unsaturated" or "unsaturated hydrocarbon" refer to a hydrocarbon or hydrocarbyl group in which one or more carbon atoms are bonded to less than four other atoms, optionally with one unfilled valence position on the one or more carbon atoms.

The term "alkyl" refers to a hydrocarbyl group having no unsaturated carbon-carbon bonds, and which may be optionally substituted. The term "alkylene" refers to an alkyl group having at least two open valence positions.

The term "silylene" refers to a silicon atom or multiple silicon atoms bonded to two hydrocarbyl groups and having two open valences at the silicon atom(s).

The term "alkenyl" refers to a hydrocarbyl group having a carbon-carbon double bond, and which may be optionally substituted. The terms "alkene" and "olefin" are used synonymously herein. Similarly, the terms "alkenic" and "olefinic" are used synonymously herein. Unless otherwise noted, all possible geometric isomers are encompassed by these terms. The term "diene" refers to an alkenyl group having two carbon-carbon double bonds, which may be conjugated or unconjugated.

The terms "aromatic" and "aromatic hydrocarbon" refer to a hydrocarbon or hydrocarbyl group having a cyclic arrangement of conjugated pi-electrons that satisfy the Huckel rule. The term "aryl" is equivalent to the term "aromatic" as defined herein. The term "aryl" refers to both aromatic compounds and heteroaromatic compounds, either of which may be optionally substituted. Both mononuclear and polynuclear aromatic and heteroaromatic compounds are encompassed by these terms. The term "arylene" refers to an aryl group having at least two open valence positions.

Examples of saturated hydrocarbyl groups include, but are not limited to, methyl, ethyl, n-propyl, isopropyl, n-butyl, isobutyl, sec-butyl, tert-butyl, pentyl, isopentyl, hexyl, octyl, cyclopropyl, cyclobutyl, cyclopentyl, cyclohexyl, cyclooctyl, and the like, including their substituted analogues. Examples of unsaturated hydrocarbyl groups include, but are not limited to, ethenyl, propenyl, allyl, butadienyl, cyclopropenyl, cyclobutenyl, cyclopentenyl, cyclohexenyl, cyclooctenyl and the like, including their substituted analogues.

Examples of aromatic hydrocarbyl groups include, but not limited to, phenyl, tolyl, xylyl, naphthyl, and the like, including all possible isomeric forms thereof. Heteroaryl and polynuclear heteroaryl groups may include, but are not limited to, pyridine, quinoline, isoquinoline, pyrimidine, quinazoline, acridine, pyrazine, quinoxaline, imidazole, benzimidazole, pyrazole, benzopyrazole, oxazole, benzoxazole, isoxazole, benzisoxazole, imidazoline, thiophene, benzothiophene, furan and benzofuran. Polynuclear aryl hydrocarbon groups may include, but are not limited to, naphthalene, anthracene, indane, indene, and tetralin.

The term "linear" refers to a hydrocarbon or hydrocarbyl group having a continuous carbon chain without side chain branching, in which the continuous carbon chain may be optionally substituted with heteroatoms or heteroatom groups.

The term "alpha olefin" refers to an alkenic hydrocarbon bearing a carbon-carbon double bond at a terminal (end) carbon atom of the main carbon chain.

The terms "branch" and "branched" refer to a hydrocarbon or hydrocarbyl group having a linear main carbon chain or cyclic carbon ring in which a hydrocarbyl side chain extends from the linear main carbon chain or cyclic carbon ring. Optional heteroatom substitution may be present in the linear main carbon chain, the cyclic carbon ring, or in the hydrocarbyl side chain.

The term "homopolymer" refers to a polymer in which all monomers (mer units) are the same. The term "copolymer" refers to a polymer in which two or more different monomers (mer units) are present. The term "terpolymer" refers to a polymer in which three different monomers (mer units) are present. The term "different" indicates that the monomers (mer units) differ from one another by the presence or absence of at least one atom and/or isomerically.

The term "polyolefin" refers to a polymer comprised of one or more olefinic monomers. Unless indicated otherwise, the term "polyolefin" refers to any of homopolymers, copolymers containing two different monomers, and higher copolymers, such as terpolymers.

The term "metallocene" refers to an organometallic compound having a metal center that is haptically bonded to one or more cyclopentadienyl rings or an optionally substituted variant thereof. Suitable cyclopentadienyl rings include rings such as cyclopentadiene, indene, fluorene, and the like, any of which may be optionally substituted.

The term "cyclopentadienyl" refers to the anionic form of 1,3-dicyclopentadiene, in which any of the carbon atoms may be optionally substituted with a hydrocarbyl group or a heteroatom functional group.

The term "haptically" refers to a delocalized bond formed between a transition metal and multiple atoms bearing conjugated pi-electrons, such as in a cyclopentadienyl ring.

The term "perfluoroalkyl" refers to an alkyl group that has at least a majority of its hydrogen atoms replaced with fluorine atoms, and more typically all of its hydrogen atoms replaced with fluorine atoms.

The term "perfluoroaryl" refers to an aryl group that has at least a majority of its hydrogen atoms replaced with fluorine atoms, and more typically all of its hydrogen atoms replaced with fluorine atoms.

The term "catalyst component" refers to a substance that is catalytically active on its own or becomes catalytically active when combined with a suitable cocatalyst.

For purposes of the present disclosure, when a polymer or copolymer is referred to as comprising an olefin, the olefin present in such polymer or copolymer is the polymerized form of the olefin. For example, when a copolymer or polyolefin blend of the present disclosure is said to have an "ethylene" content of 35 wt. % to 55 wt. %, it is to be understood that these mer units in the copolymer or polyolefin blend are derived from ethylene in the polymerization reaction and said derived mer units are present at 35 wt. % to 55 wt. %, based upon the weight of the copolymer or polyolefin blend formed therefrom. The recited percentages of mer units that are present represent the total percentage of the specified mer units combined between the first polyolefin and the second polyolefin.

Methods of the present disclosure may be used to produce polyolefin blends comprising a first polyolefin and a second polyolefin, in which the polyolefin blends exhibit a bimodal molecular weight distribution. More particularly, the second polyolefin may have a molecular weight that is higher than that of the first polyolefin and comprise a majority component of the polyolefin blends. The amount of the first polyolefin relative to the second polyolefin may be adjusted to afford a desired rheological profile of the polyolefin blends. Still more particularly, the first polyolefin and the second polyolefin may be produced using two different types of catalyst components to form the first polyolefin and the second polyolefin simultaneously or nearly simultaneously during a single polymerization reaction. The first polyolefin and the second polyolefin may be formed concurrently or near-concurrently in a single reactor vessel in some instances.

Accordingly, methods of the present disclosure may comprise: combining a reaction mixture comprising one or more olefinic monomers, a first catalyst component comprising a metallocene and a second catalyst component comprising at least one non-metallocene transition metal complex, and a solvent; and reacting the one or more olefinic monomers under solution polymerization conditions to form a polyolefin blend comprising a first polyolefin and a second polyolefin, in which the polyolefin blend exhibits a bimodal molecular weight distribution and the second polyolefin has a higher molecular weight than the first polyolefin. More specifically, the second catalyst component may comprise a non-metallocene transition metal complex selected from the group consisting of a pyridylbisimine complex, a pyridyldiamido complex, a quinolinyldiamido complex, a pyridylamido complex, a phenoxyimine complex, and a bridged bi-aromatic complex. Suitable examples of these types of second catalyst components are provided hereinbelow. Surprisingly, the foregoing types of catalyst components remain functional when mixed with a metallocene catalyst component to form the polyolefin blends described herein and to afford their associated advantages. The reaction mixture may be combined and reacted to form the polyolefin blend in a single reaction vessel, according to some embodiments.

According to various embodiments, non-metallocene transition metal complexes that may be suitably used as a second catalyst component in combination with a metallocene first catalyst component include transition metal complexes such as, for example, pyridylbisimine complexes, pyridyldiamido complexes, quinolinyldiamido complexes, pyridylamido complexes, phenoxyimine complexes, and bridged bi-aromatic complexes. Suitable pyridylbisimine complexes are described in U.S. Pat. No. 7,087,686, which is incorporated herein by reference in its entirety. Suitable pyridyldiamido complexes are described in U.S. Pat. No. 7,973,116, which is incorporated herein by reference in its entirety. Suitable quinolinyldiamido complexes are described in U.S. Patent Application Publication 2018/0002352, which is incorporated herein by reference in its entirety. Suitable pyridylamido complexes are described in U.S. Pat. No. 7,087,690, which is incorporated herein by reference in its entirety. Suitable phenoxyimine complexes are described in Accounts of Chemical Research, 2009, pp. 1532-1544, 42, which is incorporated herein by reference in its entirety. Suitable bridged bi-aromatic complexes are described in U.S. Pat. No. 7,091,292, which is incorporated herein by reference in its entirety. Structures of more particular examples of certain non-metallocene transition metal complexes that may suitably comprise the second catalyst component are provided herein below.

The non-metallocene transition metal complexes may comprise a transition metal that conveys suitable catalytic activity for olefin polymerization. Iron complexes of pyridylbisimine ligands may be particularly suitable. Group 4 transition metal complexes, particularly Hf or Zr complexes, of pyridyldiamido, pyridylamido, quinolinyldiamido, phenoxyimine, and bridged bi-aromatic ligands may be particularly suitable.

According to more particular embodiments, suitable non-metallocene transition metal complexes comprising the second catalyst component may be a Group 4 pyridyldiamido complex, a Group 4 quinolinyldiamido complex, or any combination thereof. In more specific examples, the Group 4 pyridyldiamido complex may be a Hf or Zr complex, and the Group 4 quinolinyldiamido complex may be a Hf or Zr quinolinyldiamido complex. In still more specific examples, non-metallocene transition metal complex comprising the second catalyst component may be a Group 4 quinolinyldiamido complex, particularly a Hf or Zr complex. As used herein with respect to a non-metallocene transition metal complex, the term "amido" refers to an anionic (deprotonated) primary or secondary amine group that is bonded to a transition metal center. Carboxamides are distinct from amido groups in the complexes of the present disclosure. Particular structural formulas are provided hereinafter.

In more particular examples, pyridyldiamido or quinolinyldiamido complexes suitable for use in the disclosure herein may be represented by Formula 1 below,

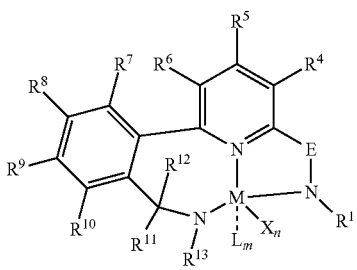

Formula 1 wherein:
M is a Group 3-10 transition metal, particularly a Group 4 transition metal such as Hf or Zr;
E is $C(R^3)(R^{3'})$ or $C(R^2)$ joined to form a ring with $R^4$;
X is an anionic leaving group, particularly a halide, amido, alkoxo, aryloxo, perfluoroalkoxo, or perfluoroaryloxo leaving group, with two X optionally being joined to form a dianionic leaving group;
L is a neutral Lewis base, with two L optionally being joined to form a bidentate Lewis base, particular examples of L being an ether, amine, phosphine or thioether;
$R^1$ and $R^{13}$ are independently selected from an optionally substituted hydrocarbyl or an optionally substituted silyl group, with particular examples being optionally substituted alkyl, alkenyl, alkynyl, cycloalkyl, or aryl groups, as defined above;
$R^2$ is a hydrocarbyl group containing 1-10 carbon atoms that is joined with $R^4$ to form an aromatic ring;

$R^3$, $R^{3'}$, $R^4$, $R^5$, $R^6$, $R^7$, $R^8$, $R^9$, $R^{10}$, $R^{11}$, and $R^{12}$ are each independently selected from hydrogen, optionally substituted hydrocarbyl, alkoxy, aryloxy, silyl, amino, substituted amino, halogen, and phosphino;
n is 1 or 2; and
m is 0, 1, or 2. Optionally, one X may be joined to one L to form a monoanionic bidentate group. Optionally, adjacent members of $R^3$, $R^{3'}$, $R^4$, $R^5$, $R^6$, $R^7$, $R^8$, $R^9$, $R^{10}$, $R^{11}$, and $R^{12}$ may be joined to form a ring.

In particular examples, the non-metallocene transition metal complex comprising the second catalyst component may be a pyridiyldiamido complex having Formula 2,

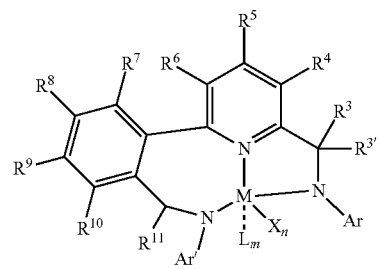

Formula 2 wherein:
Ar and Ar' are optionally substituted aryl groups;
$R^{11}$ is hydrogen or an optionally substituted aryl group; and
the remaining variables are defined as above for Formula 1.

In more particular examples of the non-metallocene transition metal complex defined by Formula 2, R4-R10 may all be hydrogen. More specific examples of suitable pyridyldiamido complexes defined by Formula 2 may be found in U.S. Pat. No. 7,973,116, which was incorporated by reference above.

In other particular examples, the non-metallocene transition metal complex comprising the second catalyst component may be a quinolinyldiamido complex having Formula 3,

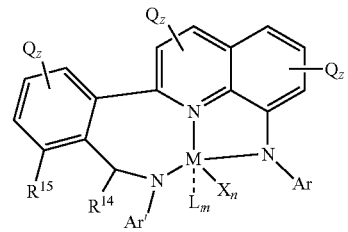

Formula 3 wherein:
$Q_z$ represents optional functionality upon each aromatic or heteroaromatic ring (z is an integer ranging from 0 up to the maximum number of potentially open valence positions upon each ring, i.e., 0, 1, 2 or 3);
Ar and Ar' are optionally substituted aryl groups;
$R^{14}$ and $R^{15}$ are each H or may be joined together in a five- or six-membered carbocyclic ring, particularly a five- or six-membered alkylene ring or a six-membered aromatic ring; and
the remaining variables are defined as above for Formula 1.

Other more specific examples of quinolinyldiamido complexes defined by Formula 3 above may be found in U.S. Patent Application Publication 2018/0002352, which was incorporated by reference above.

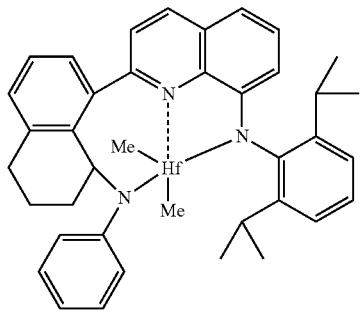

Formula 4

Other more specific examples of quinolinyldiamido complexes defined by Formula 3 above may be found in U.S. Patent Application Publication 2018/0002352, which was incorporated by reference above.

Suitable metallocene compounds for use in the present disclosure as the first catalyst component may include any metallocene compound capable of affecting olefin polymerization to form a low molecular weight polyolefin polymer. Suitable examples are defined further below.

Metallocene compounds suitable for use in the disclosure herein include a transition metal that is haptically bonded to at least one optionally substituted cyclopentadienyl ring, more typically two optionally substituted cyclopentadienyl rings. Some metallocene compounds suitable for use in the disclosure herein may feature one or more atoms (distinct from the transition metal) linking the cyclopentadienyl rings covalently to each other. For example, two cyclopentadienyl rings may be bridged with an alkylene or silylene group in some metallocene compounds that are capable of affecting olefin polymerization. Suitable cyclopentadienyl rings may include, for example, optionally substituted cyclopentadiene, optionally substituted indene, optionally substituted fluorene, bridged variants thereof, and the like. Suitable transition metals for inclusion in the metallocene compounds may include, for example, Sc, Ti, Zr, Hf, V, Nb, Ta, Mn, Re, Fe, Ru, Os, Co, Rh, Ir, and Ni. The oxidation state of the selected transition metal may range from 0 to +7, more typically an oxidation state of +3 or +4. Additional ligands bonded to the transition metal and the oxidation state of the transition metal may be selected such that the metallocene compounds are electrically neutral, unless otherwise indicated. Additional ligands bonded to the transition metal may be selected such that they are readily removed under solution polymerization conditions, such as in the presence of an activator, to provide an open coordination site for affecting olefin polymerization. Illustrative ligands that may be readily removed to generate a catalytically active metallocene include, for example, halide, amido, alkoxo, aryloxo, perfluoroalkoxo, or perfluoroaryloxo.

Particular metallocene compounds or portions thereof that may be suitable for use in the disclosure herein are shown in Formulas 5-12 and the accompanying disclosure below. It is to be understood that any metallocene compounds depicted or described herein refer equivalently to both the activated or unactivated forms of the metallocene compounds.

Formula 5 shows the structure of monocyclopentadienyl organometallic compounds that may be suitable for use as the metallocene in the disclosure herein.

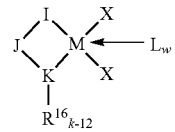

Formula 5 wherein:
M is a group 4 metal, particularly titanium;
I is a divalent substituted or unsubstituted monocyclic or polycyclic arenyl ligand that is pi-bonded (haptically bonded) to M;
J is a divalent bridging group;
K is a group 15 or 16 element with a coordination number of three if from group 15 or with a coordination number of two if from group 16 of the Periodic Table of Elements;
k is the coordination number of K, such that when K is a group 16 element, z is 2 and $R^{16}$ is absent;
$R^{16}$ is a hydrocarbyl group, including substituted hydrocarbyl groups such as halocarbyl and substituted halocarbyl groups;
L is a neutral Lewis base; and
w is an integer representing the number of L bonded to M, where w is 0, 1, or 2. Optionally any L and any X may be bonded to one another. Each X is independently hydrogen, halogen, hydrocarbyl or substituted hydrocarbyl, halocarbyl or substituted halocarbyl, silylcarbyl or substituted silylcarbyl, or germylcarbyl or substituted germylcarbyl. Optionally, two X may be joined and bound to M to form a metallacycle ring containing from about 3 to about 20 carbon atoms, or both X together can be an olefin, diolefin or aryne ligand. In some embodiments, both X may independently be a halogen, alkoxide, aryloxide, amide, phosphide or other univalent anionic ligand or both X can also be joined to form an anionic chelating ligand.

Suitable examples of I include, for example, substituted or unsubstituted cyclopentadienyl, indenyl, fluorenyl, heterocyclopentadienyl, heterophenyl, heteropentalenyl, heterocyclopentapentalenyl, heteroindenyl, heterofluorenyl, heterocyclopentanaphthyl, heterocyclopentaindenyl, or heterobenzocyclopentaindenyl ligands, and the like.

Formula 6 shows the structure of more particular examples of monocyclopentadienyl organometallic compounds that may be suitable for use as the metallocene in the disclosure herein.

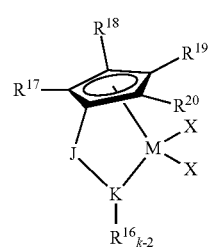

Formula 6 wherein:
J is a divalent bridging group comprising C, Si, or both;
M is a group 4 metal (Hf, Zr, or Ti, particularly Ti);
each X is independently a univalent anionic ligand, two X are joined and bound to M to form a metallocycle ring, or two X are joined to form a chelating ligand, a diene ligand, or an alkylidene ligand;
each $R^{16}$, $R^{17}$, $R^{18}$, $R^{19}$, and $R^{20}$ is independently hydrogen, a $C_1$-$C_{50}$ hydrocarbyl or substituted hydrocarbyl, halocarbyl or substituted halocarbyl, provided that any one or more of the pairs $R^{17}$ and $R^{18}$, $R^{18}$ and $R^{19}$, and $R^{19}$ and $R^{20}$, may optionally be bonded together to form a saturated or partially saturated cyclic or fused ring structure;
K is a group 15 or 16 element with a coordination number of three if from group 15 or with a coordination number of two if from group 16 of the Periodic Table of Elements; and
k is the coordination number of K. In particular embodiments, K is N, O, S, or P, particularly N, O, or P, and still more particularly N. When K is a group 16 element, z is 2 and $R^{16}$ is absent.

In certain embodiments, divalent bridging group J is represented by $R^*_2C$, $R^*_2Si$, $R^*_2CCR^*_2$, $R^*C=CR^*$, $R^*_2CSiR^*_2$, or $R^*_2SiSiR^*_2$, where each $R^*$ is, independently, hydrogen or a $C_1$ to $C_{20}$ hydrocarbyl or substituted hydrocarbyl, halocarbyl, or substituted halocarbyl. Optionally two or more adjacent $R^*$ may be joined to form a substituted or unsubstituted, saturated, partially unsaturated or aromatic, cyclic or polycyclic substituent. In some or other embodiments, divalent bridging group J comprises carbon and/or silicon atoms in the form of a dialkylsilyl group, with J being selected from $CH_2$, $CH_2CH_2$, $C(CH_3)_2$, $SiMe_2$, $SiEt_2$, $SiPh_2$, $SiMePh$, $Ph_2C$, $(p$-$(Et)_3SiPh)_2C$, $Si(CH_2)_3$, $Si(CH_2)_4$, and $Si(CH_2)_5$.

In certain embodiments, each X in Formula 6 is selected independently from the group consisting of hydrocarbyl or substituted hydrocarbyl having from 1 to 20 carbon atoms, halogen, hydride, amide, alkoxide, sulfide, phosphide, diene, amine, phosphine, ether, and any combination thereof. Two X may form a part of a fused ring or a ring system. In particular embodiments, each X is independently selected from halides and $C_1$ to $C_5$ alkyl groups. For instance, each X may be a chloro, bromo, methyl, ethyl, propyl, butyl or pentyl group. In specific embodiments, each X is a methyl group.

In some embodiments, each $R^{16}$, $R^{17}$, $R^{18}$, $R^{19}$, and $R^{20}$ is independently selected from among the group consisting of H; $CH_3$; $CH_2CH_3$; $CH_2CH_2CH_3$; $CH_2(CH_2)_2CH_3$; $CH_2(CH_2)_{3-30}CH_3$; $CH_2C(CH_3)_3$; $CH=CH_2$; $CH(CH_3)_2$; $CH_2CH(CH_3)_2$; $CH_2CH_2CH(CH_3)_2$; $C(CH_3)_2CH(CH_3)_2$; $CH(C(CH_3)_3)CH(CH_3)_2$; $C(CH_3)_3$; $CH_2Si(CH_3)_3$; $CH_2Ph$; $C_4H_7$; $C_5H_9$; $C_6H_{11}$; $C_7H_{13}$; $C_8H_{15}$; $C_9H_{17}$; $C_{12}H_{23}$, $C_{10}H_{15}$, $C_6H_5$; $CH_2Si(CH_3)_3$; $CH_2CH=CH_2$; $CH_2CH_2CH=CH_2$; $CH_2CH_2(CF_2)_7CF_3$; $CF_3$; $N(CH_3)_2$; $N(C_2H_5)_2$; and $OC(CH_3)_3$.

In particular embodiments, each of $R^{17}$, $R^{18}$, $R^{19}$, and $R^{20}$ is independently $C_1$-$C_{10}$ alkyl or hydrogen. For instance, each of $R^{17}$, $R^{18}$, $R^{19}$, and $R^{20}$ may be methyl or hydrogen. In specific embodiments, each of $R^{17}$, $R^{18}$, $R^{19}$, and $R^{20}$ is methyl (such as is the case for catalysts such as dimethylsilylene (tetramethylcyclopentadienyl) (cyclododecylamido)titanium dimethyl). Alternatively, in other embodiments, one of $R^{17}$, $R^{18}$, $R^{19}$, and $R^{20}$ is hydrogen, with the remaining $R^{17}$, $R^{18}$, $R^{19}$, and $R^{20}$ each being methyl, (such as is the case for catalysts including dimethylsilylene(trimethylcyclopentadienyl)(cyclododecylamido)titanium dimethyl). In yet further embodiments, any of the pairs $R^{17}$ and $R^{18}$, $R^{18}$ and $R^{19}$, and $R^{19}$ and $R^{20}$ may be bonded together so as to form, together with the cyclopentadienyl moiety to which those pairs are attached, an indenyl, s-indacenyl, or as-indacenyl group (such as is the case for dimethylsilylene (6-methyl-1,2,3,5-tetrahydro-s-indacen-5-yl)(tert-butylamido)titanium dimethyl).

In yet further example embodiments, K is nitrogen, and $R^{16}$ is selected from a $C_1$-$C_{30}$ hydrocarbyl or substituted hydrocarbyl group, a halocarbyl group, or a substituted halocarbyl group.

In further example embodiments, K is nitrogen, and $R^{16}$ is a $C_1$ to $C_{12}$ hydrocarbyl group such as methyl, ethyl, propyl (n- or iso-), butyl (n-, iso-, sec-, or tert-), or similar homologue or branched variant thereof. For instance, $R^{16}$ may be tert-butyl in a particular example. Alternatively, $R^{16}$ in certain embodiments may be a cyclic group such as adamantyl, cyclopropyl, cyclobutyl, cyclopentyl, cyclohexyl, cycloheptyl, cylcooctyl, cyclononyl, cyclodecyl, cylcododecyl, or norbornyl. Alternatively, $R^{16}$ in certain embodiments may an aromatic group such as phenyl, tolyl (o-, m- or p-), naphthyl, anthracenyl, or the like. In some embodiments, $R^{16}$ is t-butyl and/or cyclododecyl, and K is N.

Particular examples of compounds corresponding to Formula 6 include, for example, dimethylsilylene(tetramethylcyclopentadienyl)(cyclododecylamido)titanium dimethyl; dimethylsilylene(tetramethylcyclopentadienyl)(tert-butylamido)titanium dimethyl; dimethylsilylene(tetramethylcyclopentadienyl)(adamantylamido)titanium dimethyl; dimethylsilylene(tetramethylcyclopentadienyl) (cyclooctylamido)titanium dimethyl; dimethylsilylene (tetramethylcyclopentadienyl)(cyclohexylamido)titanium dimethyl; dimethylsilylene(tetramethylcyclopentadienyl) (norbornylamido)titanium dimethyl dimethylsilylene(trimethylcyclopentadienyl)(cyclododecylamido)titanium dimethyl; dimethylsilylene(trimethylcyclopentadienyl) (adamantylamido)titanium dimethyl; dimethylsilylene (trimethylcyclopentadienyl)(tert-butylamido)titanium dimethyl; dimethylsilylene(6-methyl-1,2,3,5-tetrahydro-s-indacen-5-yl)(tert-butylamido)titanium dimethyl; dimethylsilylene(6-methyl-1,2,3,5-tetrahydro-s-indacen-5-yl)(adamantylamido)titanium dimethyl; dimethylsilylene(6-methyl-1,2,3,5-tetrahydro-s-indacen-5-yl) (cyclooctylamido)titanium dimethyl; dimethylsilylene(6-methyl-1,2,3,5-tetrahydro-s-indacen-5-yl) (cyclohexylamido)titanium dimethyl; dimethylsilylene(6-methyl-1,2,3,5-tetrahydro-s-indacen-5-yl) (cyclododecylamido)titanium dimethyl; dimethylsilylene(2,2,6-trimethyl-1,2,3,5-tetrahydro-s-indacen-5-yl) (adamantylamido)titanium dimethyl; dimethylsilylene(2,2,6-trimethyl-1,2,3,5-tetrahydro-s-indacen-5-yl) (cyclohexylamido)titanium dimethyl; dimethylsilylene(2,2,6-trimethyl-1,2,3,5-tetrahydro-s-indacen-5-yl) (cyclododecylamido)titanium dimethyl; dimethylsilylene(2,2,6-trimethyl-1,2,3,5-tetrahydro-s-indacen-5-yl)(tert-butylamido)titanium dimethyl and any combination thereof.

Formula 7 shows the structure of organometallic compounds having bis haptic coordination that may be suitable for use as the metallocene in the disclosure herein.

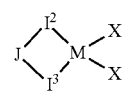

Formula 7 wherein:
M is a group 4 metal, particularly hafnium;
$I^2$ is a divalent substituted or unsubstituted fluorenyl, heterocyclopentapentalenyl, or heterofluorenyl ligand that is pi-bonded (haptically bonded) to M;
$I^3$ is a divalent cyclopentadienyl ring, a substituted cyclopentadienyl ring, a heterocyclopentadienyl ring, or a substituted heterocyclopentadienyl ring ligand that is pi-bonded (haptically bonded) to M;
J is a divalent bridging group; and
each X is independently, halogen, hydride, hydrocarbyl or substituted hydrocarbyl, halocarbyl or substituted halocarbyl, silylcarbyl or substituted silylcarbyl, germylcarbyl or substituted germylcarbyl; both X are joined and bound to M to form a metallacycle ring containing from about 3 to about 20 carbon atoms; or both X together can be an olefin, diolefin or aryne ligand. In some embodiments, both X may independently be a halogen, alkoxide, aryloxide, amide, phosphide or other univalent anionic ligand or both X can also be joined to form an anionic chelating ligand.

Formula 8 shows the structure of more particular examples of organometallic compounds having bis haptic coordination that may be suitable for use as the metallocene in the disclosure herein.

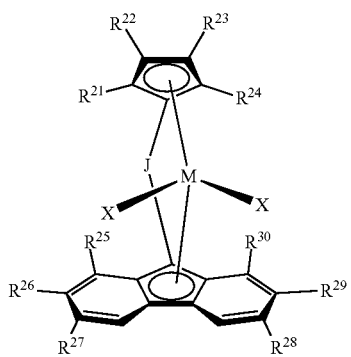

Formu;a 8 wherein:
J is a divalent bridging group comprising C, Si, or both;
M is a group 4 metal (Hf, Zr, or Ti, particularly Hf in certain embodiments);
each X is independently a univalent anionic ligand; two X are joined and bound to M to form a metallocycle ring; or two X are joined to form a chelating ligand, a diene ligand, or an alkylidene ligand; and
each $R^{21}$, $R^{22}$, $R^{23}$, $R^{24}$, $R^{25}$, $R^{26}$, $R^{27}$, $R^{28}$, $R^{29}$, and $R^{30}$ is independently hydrogen, $C_1$-$C_{50}$ hydrocarbyl or substituted hydrocarbyl, halocarbyl or substituted halocarbyl, provided that any one or more of the pairs $R^{21}$ and $R^{22}$, $R^{23}$ and $R^{24}$, $R^{25}$ and $R^{26}$, $R^{26}$ and $R^{27}$, $R^{28}$ and $R^{29}$, and $R^{29}$ and $R^{30}$, may optionally be bonded together to form a saturated or partially saturated cyclic or fused ring structure. In certain embodiments, divalent bridging group J may be $R^*_2C$, $R^*_2Si$, $R^*_2CCR^*_2$, $R^*C=CR^*$, $R^*_2CSiR^*_2$, or $R^*_2SiSiR^*_2$, where each $R^*$ is, independently, hydrogen or a $C_1$ to $C_{20}$ hydrocarbyl or substituted hydrocarbyl and optionally two or more adjacent $R^*$ may be joined to form a substituted or unsubstituted, saturated, partially unsaturated or aromatic, cyclic or polycyclic substituent. In some embodiments, J comprises carbon and/or silicon atoms, such as dialkylsilyl. In such embodiments, J may be selected from $CH_2$, $CH_2CH_2$, $C(CH_3)_2$, $SiMe_2$, $SiEt_2$, $SiPh_2$, $SiMePh$, $Ph_2C$, $(p\text{-}(Et)_3SiPh)_2C$, $Si(CH_2)_3$, $Si(CH_2)_4$, and $Si(CH_2)_5$. Alternately, J may be specified as above for Formula 6.

In certain embodiments, each X may be selected in accordance with the disclosure above. That is, each X may independently be selected from the group consisting of hydrocarbyl groups having from 1 to 20 carbon atoms, halogens, hydrides, amides, alkoxides, sulfides, phosphides, halides, dienes, amines, phosphines, ethers, and any combination thereof. Two X groups may alternately form a part of a fused ring or a ring system. In particular embodiments, each X may be independently selected from halides and $C_1$ to $C_5$ alkyl groups. For instance, each X may be a chloro, bromo, methyl, ethyl, propyl, butyl or pentyl group. In specific embodiments, each X may be a methyl group.

In some embodiments, each $R^{21}$, $R^{22}$, $R^{23}$, $R^{24}$, $R^{25}$, $R^{26}$, $R^{27}$, $R^{28}$, $R^{29}$, and $R^{30}$ is independently selected from H, $CH_3$, $CH_2CH_3$, $CH_2CH_2CH_3$, $CH_2(CH_2)_2CH_3$, $CH_2(CH_2)_{3-30}CH_3$, $CH_2C(CH_3)_3$, $CH=CH_2$, $CH(CH_3)_2$, $CH_2CH(CH_3)_2$, $CH_2CH_2CH(CH_3)_2$, $C(CH_3)_2CH(CH_3)_2$, $CH(C(CH_3)_3)CH(CH_3)_2$, $C(CH_3)_3$, $CH_2Si(CH_3)_3$, $CH_2Ph$, $C_4H_7$, $C_5H_9$, $C_6H_{11}$, $C_7H_{13}$, $C_8H_{15}$, $C_9H_{17}$, $C_6H_5$, $CH_2Si(CH_3)_3$, $CH_2CH=CH_2$, $CH_2CH_2CH=CH_2$, $CH_2CH_2(CF_2)_7CF_3$, $CF_3$, $N(CH_3)_2$, $N(C_2H_5)_2$, and $OC(CH_3)_3$.

In certain embodiments, any one or more of $R^{21}$, $R^{22}$, $R^{23}$, $R^{24}$, $R^{25}$, $R^{26}$, $R^{27}$, $R^{28}$, $R^{29}$, and $R^{30}$ may be hydrogen, methyl, ethyl, n-propyl, i-propyl, s-butyl, i-butyl, n-butyl, t-butyl, and so on for various isomers for $C_5$ to $C_{10}$ alkyl groups. In certain embodiments, $R^{26}$ and $R^{29}$ may be t-butyl. In some such embodiments, $R^{21}$, $R^{22}$, $R^{23}$, $R^{24}$, $R^{25}$, $R^{27}$, $R^{28}$, and $R^{30}$ may each be independently selected from H, methyl, and ethyl. In certain embodiments, each $R^{21}$-$R^{30}$ group other than $R^{26}$ and $R^{29}$ is H.

Other particular examples of metallocene compounds that may be suitable for use in the disclosure herein are fluorenyl-cyclopentadienyl compounds, such as those shown in Formula 9.

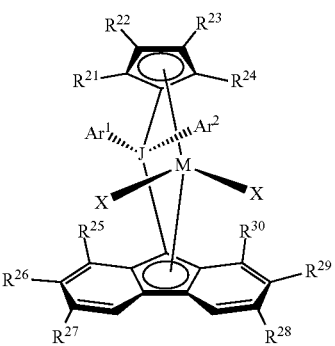

Formula 9 wherein M, X, and $R^{21}$—$R^{30}$ are defined and selected as above, J' is a silicon atom or carbon atom, and $Ar^1$ and $Ar^2$ are independently $C_6$-$C_{30}$ aryl or substituted aryl groups.

In certain embodiments, at least one of the $Ar^1$ and $Ar^2$ contains at least one hydrocarbylsilyl substituent group having the formula $R^{*'}_nSiR''_3$, where each R" is independently a $C_1$-$C_{20}$ hydrocarbyl or substituted hydrocarbyl, halocarbyl or substituted halocarbyl, or silylcarbyl or substituted silylcarbyl substituent, $R^{*'}$ is a $C_1$-$C_{10}$ substituted or unsubstituted alkyl, alkenyl, and/or alkynyl linking group between Si and the aryl group, and n=0 or 1. For example, when n is 0, one or both of $Ar^1$ and $Ar^2$ may be trimethylsilylphenyl ($Me_3SiPh$), triethylsilylphenyl ($Et_3SiPh$), tripropylsilylphenyl ($Pr_3SiPh$), or the like. Similarly, when n is 1, R*' is present as a linking group, for example a $C_2$ linking group (e.g., an ethyl linking group), and one or both of $Ar^1$ and $Ar^2$ may be (trimethylsilyl)ethylphenyl ($Me_3SiCH_2CH_2Ph$), or the like.

Thus, for example, certain embodiments may feature $R^{26}$ and $R^{29}$ each being t-butyl; $R^{21}$-$R^{24}$, $R^{25}$, $R^{27}$, $R^{28}$, and $R^{30}$ each being H; $Ar^1$ and $Ar^2$ each being $Et_3SiPh$; J being C; M being Hf; and each X being methyl. Accordingly, an example metallocene catalyst can be given as 1,1'-bis(4-triethylsilylphenyl)methylene-(cyclopentadienyl)(2,7-di-tert-butyl-fluoren-9-yl)hafnium dimethyl.

In some or other embodiments, particularly useful fluorenyl-cyclopentadienyl group 4 complexes include, for example, dimethylsilylene(cyclopentadienyl)(2,7-di-tert-butyl-fluoren-9-yl)hafnium dimethyl; dimethylsilylene(cyclopentadienyl)(3,6-di-tert-butyl-fluoren-9-yl)hafnium dimethyl; diphenylmethylene(cyclopentadienyl)(2,7-di-tert-butyl-fluoren-9-yl)hafnium dimethyl; diphenylmethylene(cyclopentadienyl)(3,6-di-tert-butyl-fluoren-9-yl)hafnium dimethyl; isopropylidene(cyclopentadienyl)(2,7-di-tert-butyl-fluoren-9-yl)hafnium dimethyl; isopropylidene(cyclopentadienyl)(3,6-di-tert-butyl-fluoren-9-yl)hafnium dimethyl; dimethylsilylene(cyclopentadienyl)(2,7-dimethylfluoren-9-yl)hafnium dimethyl; dimethylsilylene(cyclopentadienyl)(3,6-dimethylfluoren-9-yl)hafnium dimethyl; diphenylmethylene(cyclopentadienyl)(2,7-dimethylfluoren-9-yl)hafnium dimethyl; diphenylmethylene(cyclopentadienyl)(3,6-dimethylfluoren-9-yl)hafnium dimethyl; dimethylsilylene(cyclopentadienyl)(fluoren-9-yl)hafnium dimethyl, isopropylidene(cyclopentadienyl)(fluoren-9-yl)hafnium dimethyl, diphenylmethylene(cyclopentadienyl)(fluoren-9-yl)hafnium dimethyl, and 1,1'-bis(4-triethylsilylphenyl)methylene(cyclopentadienyl)(2,7-di-tert-butyl-fluoren-9-yl)hafnium dimethyl.

In one embodiment, low molecular weight polyolefins (oligomers) can be produced using one or more activators in combination with one or more of the metallocene catalysts discussed above. Suitable metallocene catalysts include those having bridges (especially silyl- or germanyl-bridged) bis-cyclopentadienyl, bridged bis-indenyl, or bridged bis-tetrahydroindenyl zirconocenes or hafnocenes, more particularly those that are $C_1$ to $C_6$ substituted in one or two positions on each of the ring systems bound to the transition metal center.

Still more particular examples of metallocenes suitable for use in the disclosure herein are shown in Formula 10 below

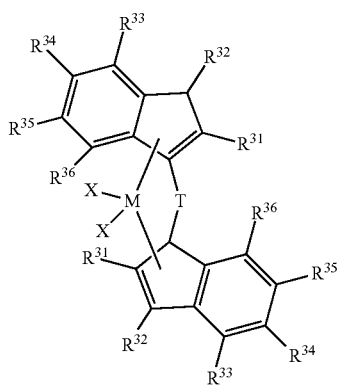

Formula 10 wherein:
M is Hf or Zr;
each X is independently selected from the group consisting of a substituted or unsubstituted hydrocarbyl having from 1 to 20 carbon atoms, hydrides, amides, alkoxides, sulfides, phosphides, halides, dienes, amines, phosphines, ethers, and a combination thereof, or two X may form a part of a fused ring or a ring system; each X may be independently selected from halides and $C_1$ to $C_6$ hydrocarbyl groups, with each X being methyl, ethyl, propyl, butyl, phenyl, benzyl, chloride, bromide, or iodide in particular embodiments;

each $R^{31}$ is independently a substituted or unsubstituted $C_1$ to $C_{10}$ alkyl group, such as methyl, ethyl, propyl, butyl, pentyl, hexyl, heptyl, octyl, nonyl, decyl, or isomers thereof, particularly methyl, n-propyl, or n-butyl, and more particularly methyl;

each $R^{32}$ is independently a substituted or unsubstituted $C_1$ to $C_{10}$ alkyl group, such as methyl, ethyl, propyl, butyl, pentyl, hexyl, heptyl, octyl, nonyl, decyl, or isomers thereof, particularly methyl, n-propyl, or butyl, and more particularly n-propyl;

each $R^{33}$ is hydrogen;

each $R^{34}$, $R^{35}$ and $R^{36}$ is independently hydrogen or a substituted or unsubstituted hydrocarbyl group, a heteroatom or heteroatom-containing group, particularly instances wherein $R^{34}$, $R^{35}$ and $R^{36}$ are all hydrogen;

T is a bridging group represented by the formula $R^a_2J$, wherein J is C, Si or Ge, particularly Si; and each $R^a$ is, independently, hydrogen, halogen or a $C_1$ to $C_{20}$ hydrocarbyl group, such as methyl, ethyl, propyl, butyl, pentyl, hexyl, heptyl, octyl, phenyl, benzyl, substituted phenyl, or two $R^a$ can form a cyclic structure including aromatic, partially saturated or saturated cyclic or fused ring system; and further provided that any two adjacent members of $R^{31}$-$R^{36}$ may form a fused ring or multicenter fused ring system where the rings may be aromatic, partially saturated or saturated. T may also be a bridging group as defined above for $R^a_2J$, and further provided that any of adjacent $R^{34}$, $R^{35}$ and $R^{36}$ may form a fused ring or multicenter fused ring system where the rings may be aromatic, partially saturated or saturated.

Particular metallocene compounds that may be compatible with the disclosure herein include those capable of producing a low molecular weight polyolefin (oligomer). Such metallocene compounds may include one or more of rac-dimethylsilyl bis(2-methyl,3-propylindenyl)hafniumdimethyl, rac-dimethylsilyl bis(2-methyl,3-propylindenyl)zirconiumdimethyl, rac-dimethylsilyl bis(2-ethyl,3-propylindenyl)hafniumdimethyl, rac-dimethylsilyl bis(2-ethyl,3-propylindenyl)zirconiumdimethyl, rac-dimethylsilyl bis(2-methyl,3-ethylindenyl)hafniumdimethyl, rac-dimethylsilyl bis(2-methyl,3-ethylindenyl)zirconiumdimethyl, rac-dimethylsilyl bis(2-methyl,3-isopropylindenyl)hafniumdimethyl, rac-dimethylsilyl bis(2-methyl,3-isopropylindenyl)zirconiumdimethyl, rac-dimethylsilyl bis(2-methyl,3-butyllindenyl)hafniumdimethyl, rac-dimethylsilyl bis(2-methyl,3-butylindenyl)zirconiumdimethyl, rac-dimethylgermanyl bis(2-methyl,3-propylindenyl)hafniumdimethyl, rac-dimethylgermanyl bis (2-methyl,3-propylindenyl)zirconiumdimethyl, rac-dimethylgermanyl bis(2-ethyl,3-propylindenyl)hafniumdimethyl, rac-dimethylgermanyl bis(2-ethyl,3-propylindenyl)zirconiumdimethyl, rac-dimethylgermanyl bis(2-methyl,3-ethylindenyl)hafniumdimethyl, rac-dimethylgermanyl bis(2-methyl,3-ethylindenyl)zirconiumdimethyl, rac-dimethylgermanyl bis(2- methyl,3-isopropylindenyl)hafniumdimethyl, rac-dimethylgermanyl bis(2-methyl,3-isopropylindenyl) zirconiumdimethyl, rac-dimethylgermanyl bis(2-methyl,3-butyllindenyl)hafniumdimethyl, rac-dimethylgermanyl bis (2-methyl,3-propylindenyl)zirconiumdimethyl, rac-dimethylsilyl bis(2-propyl,3-methylindenyl) hafniumdimethyl, rac-dimethylsilyl bis(2-propyl,3-methylindenyl)zirconiumdimethyl, rac-dimethylsilyl bis(2-propyl,3-ethylindenyl)hafniumdimethyl, rac-dimethylsilyl bis(2-propyl,3-ethylindenyl)zirconiumdimethyl, rac-dimethylsilylbis(2-propyl,3-butylindenyl)hafniumdimethyl, rac-dimethylsilylbis(2-propyl,3-butylindenyl)zirconiumdimethyl, rac-dimethylsilyl bis(2-methyl,3-butylindenyl)hafniumdimethyl, rac-dimethylsilyl bis(2-methyl,3-butylindenyl)zirconiumdimethyl, rac-dimethylsilyl bis(2,3-dimethyl) hafniumdimethyl, rac-dimethylsilyl bis(2,3-dimethyl) zirconiumdimethyl, rac-dimethylgermanyl bis(2-propyl,3-methylindenyl)hafniumdimethyl, rac-dimethylgermanyl bis (2-propyl,3-methylindenyl)zirconiumdimethyl, rac-dimethylgermanyl bis(2-propyl,3-ethylindenyl) hafniumdimethyl, rac-dimethylgermanyl bis(2-propyl,3-ethylindenyl)zirconiumdimethyl, rac-dimethylgermanyl bis (2-propyl,3-butylindenyl)hafniumdimethyl, rac-dimethylgermanyl bis(2-propyl,3-butylindenyl) zirconiumdimethyl, rac-dimethylgermanyl bis(2-methyl,3-butylindenyl)hafniumdimethyl, rac-dimethylgermanyl bis (2-methyl,3-butylindenyl)zirconiumdimethyl, rac-dimethylgermanyl bis(2,3-dimethyl)hafniumdimethyl, rac-dimethylgermanyl bis(2,3-dimethyl)zirconiumdimethyl, and cyclotetramethylenesilylene-bis(2,4,7-trimethylinden-1-yl)hafnium dimethyl In alternate embodiments, the "dimethyl" variants listed above may instead be "dihalide" compounds (such as dichloride or difluoride instead of dimethyl) or a bisphenoxide instead of dimethyl, particularly when the metallocenes are used in combination with an alumoxane activator.

Still other particular metallocene compounds that may be compatible for use in the disclosure herein are shown in Formula 11

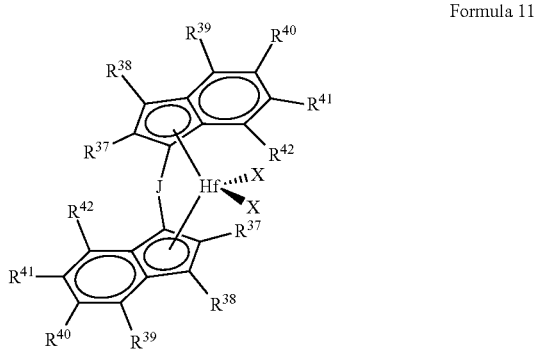

Formula 11 wherein:
J is a divalent bridging group comprising C, Si, or both;
M is a group 4 transition metal, particularly Hf;
each X is independently a univalent anionic ligand, two X are joined and bound to M to form a metallocycle ring, or two X are joined to form a chelating ligand, a diene ligand, or an alkylidene ligand; and
each $R^{37}$, $R^{38}$, $R^{39}$, $R^{40}$, $R^{41}$, and $R^{42}$ is independently hydrogen, $C_1$-$C_{50}$ substituted or unsubstituted alkyl (particularly unsubstituted $C_1$-$C_{10}$ alkyl, and more particularly $C_1$-$C_5$ alkyl), provided that any one or more of the pairs $R^{39}$ and $R^{40}$, $R^{40}$ and $R^{41}$, and $R^{41}$ and $R^{42}$ may optionally be bonded together to form a saturated or partially saturated cyclic or fused ring structure (thereby forming a bis-indenyl metallocene compound).

In certain embodiments, each X is independently selected from the group consisting of hydrocarbyl groups having from 1 to 20 carbon atoms, hydrides, amides, alkoxides, sulfides, phosphides, halides, dienes, amines, phosphines, ethers, and any combination thereof. Optionally, two X may form a part of a fused ring or a ring system. In particular embodiments, each X is independently selected from halides and $C_1$ to $C_5$ alkyl groups. For instance, each X may be a chloro, bromo, methyl, ethyl, propyl, butyl or pentyl group. In still more specific embodiments, each X is a methyl group.

In some embodiments, divalent bridging group J in Formula 11 may be represented by Formula 12

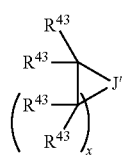

Formula 12 wherein J' is C or Si (preferably Si), x is 1, 2, 3, or 4 (particularly 2 or 3), and each $R^{43}$ is, independently, hydrogen or a $C_1$-$C_{10}$ hydrocarbyl group, particularly hydrogen. Particular examples of divalent bridging groups J, wherein J' is silicon, include cyclopentamethylenesilylene, cyclotetramethylenesilylene, cyclotrimethylenesilylene, and the like. Particular examples of divalent bridging groups J groups, wherein J' is carbon, include cyclopropandiyl, cyclobutandiyl, cyclopentandiyl, cyclohexandiyl, and the like.

In some embodiments, J may be represented by the formula $(R^{44}_2J')_n$, wherein each J' is independently C or Si (particularly Si), n is 1 or 2 (particularly 1), and each $R^{44}$ is independently a $C_1$ to $C_{20}$ substituted or unsubstituted hydrocarbyl group, provided that two or more $R^{44}$ optionally may be joined together to form a saturated or partially saturated or aromatic cyclic or fused ring structure that incorporates at least one J'. Particular examples of divalent bridging groups J meeting this structural specification include dimethylsilylene, diethylsilylene, and the like.

In particular embodiments, metallocene catalysts suitable for use in the disclosure herein may have Formula 12, in which each $R^{39}$ and $R^{42}$ is independently $C_1$-$C_5$ alkyl, particularly $C_1$-$C_3$ alkyl, and more particularly both methyl; each $R^{31}$ is H or $C_1$-$C_5$ alkyl, particularly methyl or H, and more particularly H; $R^{38}$, $R^{40}$, and $R^{41}$ is each independently H or $C_1$-$C_5$ alkyl, particularly methyl or H, and more particularly H; J is cyclopentamethylenesilylene, cyclotetramethylenesilylene, cyclotrimethylenesilylene, cyclopropandiyl, cyclobutandiyl, cyclopentandiyl, or cyclohexandiyl; M is Hf; and each X is independently a halide or $C_1$-$C_3$ alkyl, particularly methyl. In particular embodiments, for instance, the metallocene catalyst may comprise one or more of cyclotetramethylenesilylene-bis(2,4,7-trimethylinden-1-yl)hafnium dimethyl, or cyclotetramethylenesilylene-bis(4,7-dimethylinden-1-yl)hafnium dimethyl.

The metallocene catalysts suitable for use in the present disclosure may be in rac or meso form. In one particular embodiment, suitable metallocene catalysts may be in the rac form. For instance, at least 90 wt. % of the metallocene catalyst may be in the rac form, based upon the weight of the rac and meso forms present. More particularly, at least any one of about 92, 93, 94, 95, 96, 97, 98, and 99 wt. % of the metallocene catalyst may be in rac form. In one embodiment, all of the metallocene catalyst is in rac form.

The first and/or second catalyst components described above may become activated for polymerization by inclusion of one or more activators in the reaction mixture. The terms "cocatalyst" and "activator" are used interchangeably herein to refer to a compound which can activate one or more of the catalyst components described above by converting the catalyst component into a catalytically active form (e.g., through removal of a labile ligand to generate an open coordination site). Alternately, certain of the first and/or second catalyst components may be active under solution polymerization conditions without being exposed to an activator. The same or different activators may be used for activating the first and/or second catalyst components. When used, the first catalyst component and/or the second catalyst component may be exposed to the activator(s) before introduction to the reaction mixture, or the activator may be introduced to the reaction mixture after the first catalyst component and the second catalyst component have been introduced. The first and second catalyst components and/or one or more activators therefor may be introduced to the reaction mixture before or after introducing the one or more olefinic monomers to the reaction mixture.

Non-limiting activators may include, for example, alumoxanes, aluminum alkyls, ionizing activators, which may be neutral or ionic, and conventional-type cocatalysts, such as non-coordinating anion activators. Suitable activators may include alumoxane compounds (particularly alkyl alumoxanes), modified alumoxane compounds, and ionizing anion precursor compounds, any of which may abstract a reactive, σ-bound ligand from a transition metal complex. Upon extraction of the ligand with the activator, the transition metal complex may become cationic and capable of affecting olefin polymerization at the open coordination site. A charge-balancing non-coordinating or weakly coordinating anion is present to leave the open coordination site.

In some embodiments, alumoxanes may be utilized as an activator with the above catalyst components. Alumoxanes are generally oligomeric compounds containing —Al(W)—O— sub-units, where W is an alkyl group. Illustrative alumoxanes include, for example, methylalumoxane (MAO), modified methylalumoxane (MMAO), ethylalumoxane, and isobutylalumoxane. Alkyl alumoxanes and modified alkyl alumoxanes are suitable activators, particularly when at least one catalyst component contains an abstractable ligand such as an alkyl group, halide, alkoxide, or amide. Mixtures of different alumoxanes and modified alumoxanes may also be used.

Particularly suitable alumoxanes can be methylalumoxane (MAO) or modified methyl alumoxane (MMAO). An illustrative MMAO is MMAO cocatalyst type 3A (commercially available from Akzo Chemicals, Inc. under the trade name Modified Methylalumoxane type 3A), as described further in U.S. Pat. No. 5,041,584, which is incorporated herein by reference. Other suitable alumoxanes include solid polymethylalumoxane as described in U.S. Pat. Nos. 9,340,630, 8,404,880, and 8,975,209, each of which is incorporated herein by reference.

In at least one embodiment, a visually clear methylalumoxane solution can be used as an activator. A cloudy or gelled alumoxane solution can be filtered to produce a clear solution or a clear alumoxane solution can be decanted from the cloudy solution.

When the activator is an alumoxane (modified or unmodified), a suitable ratio of the alumoxane to the catalyst component(s) may be up to about a 5000-fold molar excess of the alumoxane (Al of the alumoxane:metal of catalyst component). A minimum ratio may be about a 1:1 molar ratio of alumoxane to the catalyst component(s). More specific ranges of suitable ratios include from about 1:1 to about 500:1, or about 1:1 to about 200:1, or about 1:1 to about 100:1, or about 1:1 to about 50:1 of alumoxane to catalyst component(s).

In alternate embodiments, no alumoxane or a sub-stoichiometric amount of alumoxane is used in the polymerization processes described herein. That is, in at least one embodiment, alumoxane is present at about zero mole %. Further alternately, the alumoxane may be present at a molar ratio of Al:transition metal of the catalyst component(s) of less than about 1:1.

Other suitable activators for use in the disclosure herein include compounds containing a non-coordinating anion, especially borane and borate compounds. Particularly useful borane and borate compounds containing a non-coordinating anion or a precursor to a non-coordinating anion include, for example, $B(C_6F_5)_3$, $[PhNMe_2H]^+[B(C_6F_5)_4]^-$, and $[Ph_3C]^+[B(C_6F_5)_4]^-$.

A non-coordinating anion (NCA) is an anion that either does not coordinate to the metal center of the catalyst component(s) (i.e., the transition metal) or that does coordinate to the metal center, but only weakly. The term NCA is also defined to include multicomponent NCA-containing activators, such as N,N-dimethylanilinium tetrakis(pentafluorophenyl)borate, that contain an organic cationic group and the non-coordinating anion. The term NCA is also defined to include neutral Lewis acids, which are precursors of NCAs, such as tris(pentafluorophenyl)boron, which may react with a catalyst component to form an activated species by abstraction of an anionic group. Typically, NCAs coordinate weakly enough that a neutral Lewis base, such as an olefinic or acetylenic unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon. The term non-coordinating anion includes neutral activators, ionic activators, and Lewis acid activators.

"Compatible" non-coordinating anions are those which are not degraded to neutrality when the initially formed complex decomposes. Further, the anion does not transfer an anionic substituent or fragment to the cation so as to form a neutral transition metal compound and a neutral byproduct from the anion. Non-coordinating anions useful in accordance with this specification include those that may stabilize the transition metal cation and balance its ionic charge at +1, and yet retain sufficient lability to permit displacement during polymerization.

Other suitable activators may include tri(n-butyl)ammonium tetrakis(pentafluorophenyl)borate, a tris perfluorophenylboron metalloid precursor or a trisperfluoronaphthylboron metalloid precursor, polyhalogenated heteroborane anions (as described in International Patent Application Publication 98/43983), boric acid (as described in U.S. Pat. No. 5,942,459), or any combination thereof. In another embodiment, one or more NCA activators may be chosen from the activators described in U.S. Pat. No. 6,211,105, which is incorporated herein by reference.

In more specific embodiments, NCA activators represented by Formula 13 below may be used, $$Z_d^+(A^{d-}) \quad \text{Formula 13}$$

wherein Z is (L-H) or a reducible Lewis acid, L is a neutral Lewis base, H is hydrogen, (L-H) is a Bronsted acid, $A^{d-}$ is a boron-containing non-coordinating anion having a charge of d−, and d is 1, 2, or 3.

The cation component $Z_d^+$ may include Bronsted acids such as protons or protonated Lewis bases or reducible Lewis acids capable of protonating or abstracting a moiety, such as an alkyl or aryl group, from a catalyst component of the present disclosure, resulting in a cationic transition metal species.

$Z_d^+$ may also be a moiety such as silver, tropylium, carboniums, ferroceniums, and mixtures thereof, more typically carboniums and ferroceniums. More specific reducible Lewis acids can be any triarylcarbonium ($Ar_3C^+$), where Ar is unsubstituted or substituted aryl, such as substituted with a heteroatom, a $C_1$ to $C_{40}$ hydrocarbyl, or a substituted $C_1$ to $C_{40}$ hydrocarbyl. In more specific embodiments, the unsubstituted or substituted hydrocarbyls are $C_1$ to $C_{20}$ alkyls or $C_6$ to $C_{20}$ aryls. $Z_d^+$ may be triphenylcarbonium in a still more specific example.

When $Z_d^+$ is $(L-H)_d^+$ (a Bronsted acid), it may be capable of donating a proton to the transition metal of the catalyst component(s), thereby resulting in a transition metal cation. Suitable Bronsted acids include ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, or p-nitro-N,N-dimethylaniline; phosphoniums of triethylphosphine, triphenylphosphine, or diphenylphosphine; oxoniums of ethers such as dimethyl ether diethyl ether, tetrahydrofuran or dioxane; or sulfoniums from thioethers, such as diethyl thioether or tetrahydrothiophene; and mixtures thereof.

Anion component $A^{d-}$ includes those having the formula $[M^{k+}Q_n]^{d-}$, wherein k is 1, 2, or 3; n is 1, 2, 3, 4, 5, or 6 (more typically 1, 2, 3, or 4); n−k=d; M is an element selected from Group 13 of the Periodic Table of the Elements, typically boron or aluminum, and Q is independently a hydride, bridged or unbridged dialkylamido, halide, alkoxide, aryloxide, hydrocarbyl or substituted hydrocarbyl, or halocarbyl or substituted halocarbyl, in which up to 20 carbon atoms may be present with the proviso that in not more than one instance is Q a halide. In more specific embodiments, each Q may be a fluorinated hydrocarbyl group having 1 to 20 carbon atoms, such as a perfluoroalkyl or perfluoroaryl group. In some or other embodiments, each Q may be a fluorinated aryl group, such as a pentafluoryl aryl group. Other examples of suitable $A^{d-}$ also include diboron compounds such as those disclosed in U.S. Pat. No. 5,447, 895, which is incorporated herein by reference in its entirety.

Illustrative but not limiting examples of boron compounds which may be used as an activator include those described as such in U.S. Pat. No. 8,658,556, which is incorporated by reference herein.

Bulky activators may also useful herein as NCAs. "Bulky activator" as used herein refers to anionic activators represented by Formulas 14 or 15 below.

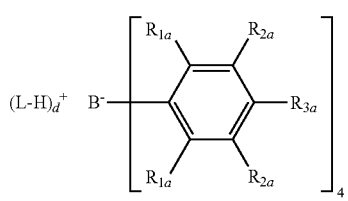

Formula 14

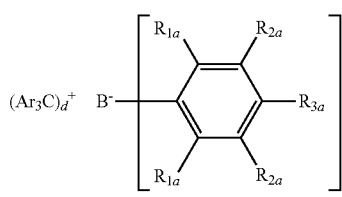

Formula 15

In Formulas 14 and 15, each Ria is independently a halide, such as a fluoride in particular embodiments; Ar is a substituted or unsubstituted aryl group, such as a substituted or unsubstituted phenyl, preferably substituted with $C_1$ to $C_{40}$ hydrocarbyls, such as $C_1$ to $C_{20}$ alkyls or $C_6$-$C_{20}$ aromatics; each $R_{2a}$ is independently a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_{2a}$ is a fluoride or a perfluorinated phenyl group); each $R_{3a}$ is independently a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_{3a}$ is a fluoride or a perfluorinated phenyl group); $R_{2a}$ and $R_{3a}$ can be joined to form one or more saturated or unsaturated, substituted or unsubstituted rings (preferably $R_{2a}$ and $R_{3a}$ are joined to form a perfluorinated phenyl ring); L is a neutral Lewis base; (L-H)* is a Bronsted acid; and d is 1, 2, or 3; and wherein the anion has a molecular weight greater than 1020 g/mol; wherein at least three of the substituents on the B atom each have a molecular volume of greater than 250 cubic Å, alternately greater than 300 cubic Å, or further alternately greater than 500 cubic Å, as specified below.

$(Ar_3C)_d^+$ may be $(Ph_3C)_d^+$, where Ph is a substituted or unsubstituted phenyl. Suitable substitutions may include $C_1$ to $C_{40}$ hydrocarbyls or substituted $C_1$ to $C_{40}$ hydrocarbyls, such as substituted or unsubstituted $C_1$ to $C_{20}$ alkyls or $C_6$ to $C_{20}$ aromatics.

"Molecular volume" is used herein as an approximation of spatial steric bulk of an activator molecule in solution. Comparison of substituents with differing molecular volumes allows a substituent with a smaller molecular volume to be considered "less bulky" in comparison to a substituent with a larger molecular volume. Conversely, a substituent with a larger molecular volume may be considered "more bulky" than a substituent with a smaller molecular volume. Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, may be calculated using Equation 1, $$MV = 8.3 Vs \quad \text{Equation 1}$$

where Vs is the scaled volume. Vs is the sum of the relative volumes of the constituent atoms, and is calculated from the molecular formula of the substituent using the following listing of relative volumes. For fused rings, the Vs is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful bulky activators, U.S. Pat. No. 8,658,556, which is incorporated by reference herein, may be consulted.

In more specific embodiments, the activator $Z_d^+(A^{d-})$ may be one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbonium tetrakis(perfluoronaphthyl)borate, triphenylcarbonium tetrakis(perfluorobiphenyl)borate, triphenylcarbonium tetrakis(3,5-bis(trifluoromethyl)phenyl)borate, triphenylcarbonium tetra(perfluorophenyl)borate, or any combination thereof.

Other suitable activators may include a triarylcarbonium, such as triphenylcarbonium tetraphenylborate, triphenylcarbonium tetrakis(pentafluorophenyl)borate, triphenylcarbonium tetrakis-(2,3,4,6-tetrafluorophenyl)borate, or any combination thereof.

Still other suitable activators may include one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, or any combination thereof. Suitable alkyl substituents may include, for example, methyl, ethyl, propyl, i-propyl, n-butyl, i-butyl, or t-butyl.

Still other suitable activators may include one or more of N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbonium tetrakis(perfluoronaphthyl)borate, triphenylcarbonium tetrakis(perfluorobiphenyl)borate, triphenylcarbonium tetrakis(3,5-bis(trifluoromethyl)phenyl)borate, triphenylcarbonium tetra(perfluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, tropylium tetrakis(perfluoronaphthyl)borate, or any combination thereof.

It is also within the scope of the present disclosure that the catalyst components may be combined with any combination of alumoxanes and NCAs (see for example, U.S. Pat. Nos. 5,153,157 and 5,453,410; EP 0 573 120 B1, and International Patent Application Publications WO 94/07928 and WO 95/14044, each which discuss the use of an alumoxane in combination with an ionizing activator and are incorporated herein by reference).

Alternately and optionally, a coactivator or chain transfer agent, such as a group 1, 2, or 13 organometallic species (e.g., an alkylaluminum compound such as tri-n-octyl aluminum), may also be used in conjunction with the catalyst components disclosed herein. The catalyst component:coactivator molar ratio may range from about 1:100 to about 100:1, or about 1:75 to about 75:1, or about 1:50 to about 50:1, or about 1:25 to about 25:1, or about 1:15 to about 15:1, or about 1:10 to about 10:1, or about 1:5 to about 5:1, or about 1:2 to about 2:1, or about 1:100 to about 1:1, or about 1:75 to about 1:1, or about 1:50 to about 1:1, or about 1:25 to about 1:1, or about 1:15 to about 1:1, or about 1:10 to about 1:1, or about 1:5 to about 1:1, or about 1:2 to about 1:1, or about 1:10 to about 2:1.

Alkylaluminum alkyl or similar organometallic compounds which may be utilized as scavengers or coactivators include, for example, trimethylaluminum, triethylaluminum, triisobutylaluminum, tri-n-hexylaluminum, tri-n-octylaluminum, and diethyl zinc. Scavengers having bulky or $C_6$ to $C_{20}$ linear hydrocarbyl substituents connected to the metal or metalloid center usually minimize adverse interaction with an activated catalyst. Examples include triethylaluminum, bulky compounds, such as tri-isobutylaluminum, triisoprenylaluminum, and long-chain linear alkyl-substituted aluminum compounds, such as tri-n-hexylaluminum, tri-n-octylaluminum, or tri-n-dodecylaluminum. When alumoxane is used as the activator, any excess over that needed for activation will scavenge impurities and additional scavengers may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$). In at least one embodiment, the scavengers are present at less than about 14 wt. %, or from about 0.1 wt. % to about 10 wt. %, or from about 0.5 wt. % to about 7 wt. %, by weight of the catalyst component (s).

The polymer blends formed according to the disclosure herein may undergo further processing following the polymerization reaction. In some embodiments, the reaction mixture may be processed to remove solvent to provide a substantially solvent-free polyolefin blend. In some or other embodiments, the polyolefin blends or substantially solvent-free polyolefin blends may be further blended with other polymers, such as linear low density polyethylenes, other elastomers, plastomers, low density polyethylene, high density polyethylenes, polypropylenes and the like. The polyolefin blends formed according to the present disclosure may also be blended with various additives. Suitable additives may include, for example, antioxidants, nucleating agents, acid scavengers, plasticizers, stabilizers, anticorrosion agents, blowing agents, ultraviolet light absorbers, quenchers, antistatic agents, slip agents, phosphites, phenolics, pigments, dyes and fillers and cure agents such as peroxide.

Solution polymerization processes may be used to carry out the polymerization reactions disclosed herein in any suitable manner known to one having ordinary skill in the art. In particular embodiments, the polymerization processes may be carried out in batch mode or in continuous polymerization processes. The term "batch" refers to processes in which the complete reaction mixture is withdrawn from the polymerization reactor vessel at the conclusion of the polymerization reaction. In contrast, in a continuous polymerization process, one or more reactants are introduced continuously to the reactor vessel and a solution comprising the polyolefin blend is withdrawn concurrently or near concurrently. Accordingly, methods of the present disclosure may also include obtaining the polyolefin blend from the single reactor vessel in a solution comprising the solvent, and evaporating the solvent to provide a substantially solvent-free polyolefin blend. Other means for separating the polyolefin blend from the solvent, such as precipitation and/or filtration are also possible. The substantially solvent-free polyolefin blend may be processed similarly to conventional polyolefin elastomer compositions comprising an oil extension, according to some embodiments.

Suitable diluents/solvents for conducting the polymerization reaction include non-coordinating, inert liquids. In particular embodiments, the reaction mixture for the solution polymerization reactions disclosed herein may include at least one hydrocarbon solvent. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); halogenated and perhalogenated hydrocarbons, such as perfluorinated $C_{4-10}$ alkanes, chlorobenzene, and mixtures thereof; and aromatic and alkyl-substituted aromatic compounds, such as benzene, toluene, mesitylene, ethylbenzene, xylene, and mixtures thereof. Mixtures of any of the foregoing hydrocarbon solvents may also be used. Suitable solvents also include liquid olefins which may act as monomers or co-monomers including ethylene, propylene, 1-butene, 1-hexene, 1-pentene, 3-methyl-1-pentene, 4-methyl-1-pentene, 1-octene, 1-decene, and mixtures thereof.

Solution polymerization conditions suitable for use in the polymerization processes disclosed herein include temperatures ranging from about 0° C. to about 300° C., or from about 20° C. to about 200° C., or from about 35° C. to about 150° C. Pressures may range from about 0.35 MPa to about 10 MPa, or from about 0.45 MPa to about 6 MPa, or about 0.5 MPa to about 4 MPa. Polymerization run times may range up to about 300 minutes, particularly in a range from about 5 minutes to about 250 minutes, or from about 10 minutes to about 120 minutes.

In some embodiments, hydrogen gas may be included in the reactor vessel in the solution polymerization conditions. The hydrogen gas may influence the properties of the resulting polyolefins, such as altering the melt flow index or molecular weight, compared to an analogous polymerization reaction conducted without the hydrogen gas. The amount of hydrogen gas that is present may also alter these properties as well. According to various embodiments, the molar ratio of hydrogen gas to the one or more olefinic monomers (e.g., provided from a feed stream) may range from about 0.0001:1 to about 10000:1. In more specific embodiments, the concentration of hydrogen gas in the reaction mixture may range up to about 5000 ppm, or up to about 4000 ppm, or up to about 3000 ppm, or up to about 2000 ppm, or up to about 1000 ppm, or up to about 500 ppm, or up to about 400 ppm, or up to about 300 ppm, or up to about 200 ppm, or up to about 100 ppm, or up to about 50 ppm, or up to about 10 ppm, or up to about 1 ppm. In some or other embodiments, hydrogen gas may be present in the reactor vessel at a partial pressure of about 0.001 psig to about 50 psig (0.007 to 345 kPa), or about 0.01 psig to about 25 psig (0.07 to 172 kPa), or about 0.1 psig to about 10 psig (0.7 to 70 kPa).

Any olefinic feed can be polymerized using polymerization methods and solution polymerization conditions disclosed herein. Suitable olefinic feeds may include any $C_2$-$C_{40}$ alkene, which may be straight chain or branched, cyclic or acyclic, and terminal or non-terminal, optionally containing heteroatom substitution. In more specific embodiments, the olefinic feed may comprise a $C_2$-$C_{20}$ alkene, particularly linear alpha olefins, such as, for example, ethene, propene, 1-butene, 1-pentene, 1-hexene, 1-octene, 1-decene, or 1-dodecene. Other suitable olefinic monomers may include ethylenically unsaturated monomers, diolefins having 4 to 18 carbon atoms, conjugated or nonconjugated dienes, polyenes, vinyl monomers and cyclic olefins. Non-limiting olefinic monomers may also include norbornene, norbornadiene, isobutylene, isoprene, vinylbenzocyclobutane, styrene, alkyl substituted styrene, ethylidene norbornene, dicyclopentadiene, cyclopentene, and cyclohexene. Any single olefinic monomer or any mixture of olefinic monomers may undergo polymerization according to the disclosure herein.

In more particular embodiments, the one or more olefinic monomers present in the reaction mixtures disclosed herein comprise at least ethylene and propylene. In still more specific embodiments, the one or more olefinic monomers may comprise ethylene, propylene, and a diene monomer. Suitable diene monomers that may be present (e.g., for forming EPDM elastomers) may include, for example, dicyclopentadiene, 5-ethylidene-2-norbornene, or 5-vinylidene-2-norbornene.

In particular embodiments of the present disclosure, the first catalyst component may comprise a metallocene that promotes formation of the first polyolefin and the second catalyst component may comprise a transition metal complex selected as above that promotes formation of the second polyolefin. According to more specific embodiments, the second polyolefin may have a weight average molecular weight of about 150,000 or higher and the first polyolefin may have a weight average molecular weight of about 50,000 or lower. Weight average molecular weights may be determined by GPC 4D, as explained further in the examples. In still more specific embodiments, the first polyolefin may have a weight average molecular weight ranging from about 10,000 to about 40,000. Weight average molecular weights within this range may be particularly suitable for replacing a conventional oil extension in the second polyolefin, such as a high molecular weight polyolefin elastomer.

The molecular weight of the polymer blends described herein may be measured using GPC 4D according to the procedure described herein. The molecular weights and molecular weight distributions of the first polymer and the second polymer in the blend are obtained using best fit with two Flory distribution functions to the molecular weight distribution curve of the polymer blend, as specified in Equation 2, $$W(r)=m_1(r_1^2 r \exp(-\tau_1 r)+(1-m_1)(\tau_2^2 r \exp(-\tau_2 r) \qquad \text{Equation 2}$$

wherein r is the chain length and $\tau_1$ and $\tau_2$ are empirical constants. The moments of molecular weight distribution can be calculated from the distribution.

The relative amounts of the first catalyst component and the second catalyst component may be selected to vary the ratio of the first polyolefin to the second polyolefin in the polyolefin blend formed according to the disclosure herein. In particular embodiments, the amount of the first catalyst component may be selected to produce a sufficient amount of the first polyolefin to facilitate processing of the polymer blend. The polyolefin blend may comprise a higher mass percentage of the second polyolefin than the first polyolefin, according to more specific embodiments.

When the second polyolefin is present in a higher mass percentage than the first polyolefin, the second catalyst component may be present in a greater molar amount than the first catalyst component. Suitable molar ratios of the second catalyst component to the first catalyst component may range from about 20:1 to about 2:1, or about 15:1 to about 3:1, or about 10:1 to about 3:1, or about 6:1 to about 3:1.

In particular embodiments, methods of the present disclosure may comprise selecting an amount of the first catalyst component that is sufficient to provide a polyolefin blend, which may contain solvent or be substantially solvent-free, having a Mooney viscosity of about 50 MU or more (MU=Mooney units), or about 60 MU or more, or about 70 MU or more, as measured using a Mooney viscometer and ASTM D-1646, as modified in the examples below. The polyolefin blend may be obtained after polymerization is complete and solvent has been removed from the reaction mixture. Selection of a suitable amount of the first catalyst component may be based upon considerations of how a given quantity of the first polyolefin affects the rheological properties of the polyolefin blend, such as the Mooney viscosity value of the polyolefin blend. Suitable rheological properties may be further dictated by the intended end use of the polyolefin blend. As such, a suitable amount of the first catalyst component may be chosen to produce a specified amount of the first polyolefin, such as to produce a desired rheological profile within the polyolefin blend.

The polyolefin blends of the present disclosure may be characterized by an average molecular weight that represents a weighted average of the amounts of the first polyolefin and the second polyolefin that are present. In some embodiments, the polyolefin blends may exhibit Mw values that are about 350,000 or greater, Mn values that are about 19,000 or greater, or Mz values that are about 700,000 or greater. These molecular weight values may be measured using the GPC-4D procedure and equipment discussed further herein.

The oil extended ethylene and alpha-olefin or ethylene, alpha-olefin and diene copolymers of the present disclosure may have an Mw of 150,000 to 2,000,000 g/mol, or 200,000 to 1,000,000 g/mol, or 250,000 to 500,000 g/mol, as measured by size exclusion chromatography, as described below in the Experimental section below, and/or an Mw/Mn of 2 to 100, or 2.5 to 80, or 3 to 60, or 3 to 50 as measured by size exclusion chromatography, and/or a Mz/Mw of 2 to 50, or 2.5 to 30, or 3 to 20, more preferably 3 to 25. The Mw referred to herein, and for purposes of the claims attached hereto, is obtained from GPC using a light scattering detector as described in the Experimental section below.

The polyolefin blends of the present disclosure (e.g., ethylene alpha-olefin or ethylene alpha-olefin and diene copolymers) have rheological characteristics of high Mooney EPDM observed by Small Amplitude Oscillatory Shear (SAOS) measurement of the molten polymer performed on a dynamic (oscillatory) rotational rheometer. From the data generated by such a test it is possible to determine the phase or loss angle δ, which is the inverse tangent of the ratio of G" (the loss modulus) to G' (the storage modulus). For a typical linear and low Mooney polymer, the loss angle at low frequencies approaches 90 degrees, because the chains can relax in the melt, adsorbing energy, and making the loss modulus much larger than the storage modulus. As frequencies increase, more of the chains relax too slowly to absorb energy during the oscillations, and the storage modulus grows relative to the loss modulus. Eventually, the storage and loss moduli become equal and the loss angle reaches 45 degrees. High Mooney polymer chains relaxes very slowly and takes long time to reach a state where all its chains can relax during an oscillation, and the loss angle never reaches 90 degrees even at the lowest frequency, ω, of the experiments. The loss angle is also relatively independent of the frequency of the oscillations in the SAOS experiment; another indication that the chains cannot relax on these timescales. In one embodiment, the phase angle of the oil extended ethylene copolymer is 45 degrees or less, or 40 degrees or less, or 35 degrees or less. Alternatively, the tan (δ) of polyolefin composition (oil extended ethylene copolymer) is 1 or less, 0.8 or less, 0.7 or less.

Rheological data may be presented by plotting the phase angle versus the absolute value of the complex shear modulus (G*) to produce a van Gurp-Palmen plot. The plot of conventional linear polyethylene polymers shows monotonic behavior and a negative slope toward higher G* values. Conventional EPDM copolymer without long chain branches exhibit a negative slope on the van Gurp-Palmen plot. For oil extended ethylene alpha-olefin or ethylene alpha-olefin and diene copolymers, the phase angles shift to a lower value as compared with the phase angle of a conventional ethylene polymer without long chain branches at the same value of G*. In one embodiment, the phase angle of the inventive oil extended ethylene copolymers is less than 45 degrees in a range of the complex shear modulus from 50,000 Pa to 1,000,000 Pa.

The degree of long chain branching can be characterized using a branching index $g'_{vis}$ measured using GPC with multiple detectors. The polyolefin compositions of the present disclosure may have $g'_{vis}$ values of about 0.95 or above, such as about 0.97 or above. These values indicate a high degree of long chain linearity and minimal branching. Alternatively, the polymer chains of the disclosed polyolefin compositions are substantially linear.

The oil extended ethylene alpha-olefin or ethylene alpha-olefin and diene copolymers disclosed herein preferably have significant shear induced viscosity thinning. Shear thinning is characterized by the decrease of the complex viscosity with increasing shear rate. One way to quantify the shear thinning is to use a ratio of complex viscosity at a frequency of 0.1 rad/s to the complex viscosity at a frequency of 100 rad/s. The complex viscosity ratio of the oil extended ethylene alpha-olefin or ethylene alpha-olefin and diene copolymers may be 50 or more, or 75 or more, or even 100 or more when the complex viscosity is measured at 125° C.

The oil extended ethylene and alpha-olefin or ethylene, alpha-olefin and diene copolymers may have a complex viscosity at 0.1 rad/sec and a temperature of 125° C. of at least 100,000 Pa·sec (preferably at least 200,000 Pa·sec, preferably from 50,000 to 1,000,000 Pa·sec, preferably from 100,000 to 1,000,000 Pa·sec).

The oil extended ethylene and alpha-olefin or ethylene, alpha-olefin and diene copolymers may have Mooney viscosity values ML (1+4 at 125° C.) ranging from a low of any one of about 40, 50 and 60 MU (Mooney units) to a high of any one of about 70, 80, 90, 100, 110, 120, 130, 140, 150, 160, 170, and 180 MU. Mooney viscosity in terms of MST (5+4 at 200° C.) may range from a low of any one of about 10, 20, and 30 MU to a high of any one of about 40, 50, 60, 70 80, 90, and 100 MU.

The oil extended ethylene and alpha-olefin or ethylene, alpha-olefin and diene copolymers may have MLRA ranging from a low of any one of about 500, 550, 600, 650, and 700 MU-sec to a high of any one of about, 800, 900, 1000, 1150, 1200, 1250, 1300, 1350, 1400, 1450, 1500, 1550, 1600, 1650, 1700, 1750, 1800, 1850, 1900, 1950, and 2000 MU-sec. For instance, MLRA may be within the range of about 500 to about 2000 MU-sec, or from about 500 to about 1500 MU-sec, or from about 600 to about 1200 MU-sec, etc. In certain embodiments, MLRA may be at least 500 MU-sec, or at least 600 MU-sec, or at least 700 MU-sec.

Alternatively, the oil extended ethylene and alpha-olefin or ethylene, alpha-olefin and diene copolymers may have cMLRA at Mooney Large Viscosity ML=80 MU ranging from a low of any one of about 500, 550, 600, 650 and 700 MU-sec to a high of any one of about 800, 900, 1000, 1150, 1200, 1250, 1300, 1350, 1400, 1450, 1500, 1550, 1600, 1650, 1700, 1750, 1800, 1850, 1900, 1950, and 2000 MU-sec. For instance, cMLRA may be within the range of about 500 to about 2000 MU-sec, or from about 600 to about 1500 MU-sec, or from about 700 to about 1200 MU-sec, etc. In certain embodiments, cMLRA may be at least 500 MU-sec (without a necessary upper boundary), or at least 600 MU-sec, or at least 700 MU-sec.

The oil extended ethylene alpha-olefin or ethylene alpha-olefin and diene copolymer in some embodiments has a bimodal distribution in composition distribution with respect to molecular weight. In one embodiment, the ethylene content is higher at the lower molecular weight side than that at the higher molecular weight side of the bimodal distribution. The difference is of 2 wt. % or more, preferably 5 wt. % or more, or 10 wt. % or more. Distribution in ethylene composition may be determined using GPC-IR technique as described below. In another embodiment, the ethylene content is lower at the lower molecular weight side than that at the higher molecular weight side of the bimodal distribution. The difference is of 2 wt. % or more, preferably 5 wt. % or more, or 10 wt. % or more.

In yet further embodiments, the polyolefin composition may be characterized as a reactor blend of two or more of the following: a first low molecular weight ethylene copolymer and a second high molecular weight ethylene copolymer. The first copolymer has monomer units derived from ethylene, a $C_3$-$C_{12}$ α-olefin, and optionally one or more dienes; and the second copolymer has monomer units derived from ethylene, a $C_3$-$C_{12}$ α-olefin, and optionally one or more dienes. The first copolymer may have ethylene content within the range of about 20 wt. % to about 80 wt. %, and the second copolymer may have ethylene content within the range of about 30 wt. % to about 80 wt. %, wherein the second copolymer has at least 5 wt. % greater ethylene content than the first copolymer. In such embodiments, the ratio of Mw of the second copolymer to Mw of the first copolymer is at least any one of about 1.5, 2, 3, 4, or 5.

In another embodiment, the ethylene content in the first and the second ethylene copolymer are different. The difference is at least 5 wt. %, preferably 10 wt. %. Alternatively, the ethylene content of the first ethylene copolymer is higher than the ethylene content of the second copolymer by at least of 5 wt. %. The ethylene distribution can be determined according to the description below. Ethylene content in each portion of the blend (e.g., in each of the first and second copolymers) can be controlled according to polymerization processes of various embodiments. For instance, two or more catalyst systems may be used to create the reactor blend, and the catalysts may be selected such that they produce polymers having different ethylene content. Alternatively or in addition, ethylene content in each fraction of the blend can be controlled through monomer concentration according to each catalyst's kinetic response of ethylene insertion rate. Or, in a process involving two or more polymerization zones, ethylene monomer feed to each zone may be varied to accomplish the differential in ethylene content among the fractions of the blend.

In one aspect, both of the first and second ethylene copolymers are amorphous. Alternatively, one of the ethylene copolymer is amorphous and another one has low crystallinity.

Furthermore, the molecular weight may be different between the first and second ethylene copolymer. In one embodiment, first ethylene copolymer has a weight averaged molecule weight (Mw) of 50,000 g/mol or less, and the second ethylene copolymer has an Mw of 100,000 or more or 150,000 or more. In one aspect of this invention, the Mw ratio of the second ethylene copolymer to the first ethylene copolymer is 1.5 or more, or 2.0 or more, or 2.5 or more.

The amount of first ethylene copolymer relative to the in-reactor blend may vary widely depending on the nature of the polymers and the intended use of the final polymer blend. In particular, however, one advantage of the present disclosure is the ability to be able to produce a polyolefin blend in which the first ethylene copolymer comprises more than 30 wt. %, such as more than 40 wt. % of the total composition. The ratio of the two copolymers in the blend can be manipulated according to processes for producing such blends according to various embodiments. For instance, where two catalysts are used for producing the blend, the concentration ratio of the two catalysts can result in different amounts of the first and second ethylene copolymers of the blend. Preferably, the ethylene copolymer having lower molecular weight is of 50 wt. % or less, or 40 wt. % or less, or 30 wt. % or less, or 20 wt. % of the total blend. Catalyst concentration in each of one or more polymerization zones can be adjusted through catalyst feed rate to the reactor. In one embodiment, the molar ratio of the first catalyst feed rate to the second catalyst feed rate is in a range of 0.05 to 20.

In addition or instead, the polymer composition may be characterized as a reactor blend comprising two ethylene copolymers (a first and a second ethylene copolymer). Preferably, the first ethylene copolymer has a Mooney viscosity (1+4 at 125° C.) of 10 MU or less and the second ethylene copolymer has a Mooney viscosity (1+4 at 125° C.) of 20 MU or more. The reactor blend has a phase angle of 50 degrees or less when measured at complex shear modulus G*=100,000 Pa and 125° C. and has an overall Mooney viscosity of at least 40 (1+4 at 125° C.). Alternatively, the final product has a tan S of 1.2 or less measured at a frequency of 10 rad/sec and a temperature of 125° C.

To facilitate a better understanding of the embodiments described herein, the following examples of various representative embodiments are given. In no way should the following examples be read to limit, or to define, the scope of the present disclosure.

EXAMPLES

Rubber Process Analyzer (RPA):

Dynamic shear melt rheological data was measured using an ATD® 1000 Rubber Process Analyzer from Alpha Technologies. A sample having a mass of approximately 4.5 grams was mounted between the parallel plates of the ATD® 1000. A nitrogen stream was circulated through the sample oven during the experiments. The test temperature was 125° C., the applied strain was 14% and the frequency was varied from 0.1 rad/s to 385 rad/s. The complex modulus (G*), complex viscosity ($\eta$*) and the phase angle ($\delta$) were measured at each frequency. A sinusoidal shear strain was applied to the material.

If the strain amplitude is sufficiently small, the material behaves linearly. The resulting steady state stress also oscillates sinusoidally at the same frequency but is shifted by phase angle $\delta$ with respect to the strain wave. The stress leads the strain by $\delta$. For purely elastic materials $\delta$=0° (stress is in phase with strain), and for purely viscous materials, $\delta$=90° (stress leads the strain by 90° although the stress is in phase with the strain rate). For viscoelastic materials, 0<$\delta$<90. Complex viscosity ($\eta$*, also referred to as dynamic viscosity or dynamic shear viscosity), loss modulus (G") and storage (complex) modulus (G') as a function of frequency are provided by the small amplitude oscillatory shear test. The phase (loss) angle ($\delta$), is the inverse tangent of the ratio of the shear loss modulus (G") to the shear storage modulus (G').

Shear Thinning Ratio:

Shear thinning is a rheological response of polymer melts, where the resistance to flow (viscosity) decreases with increasing shear rate. The complex shear viscosity is generally constant at low shear rates (Newtonian region) and decreases with increasing shear rate. In the low shear rate region, the viscosity is termed the zero shear viscosity, which is often difficult to measure for polydisperse polymer melts and/or polymer melts having long chain branching. At higher shear rates, the polymer chains are oriented in the shear direction, which reduces the number of chain entanglements relative to their un-deformed state. The reduction in chain entanglement results in lower viscosity. Shear thinning is characterized by the decrease of complex dynamic viscosity with increasing frequency of the sinusoidally applied shear. The shear thinning ratio is defined as the ratio of the complex shear viscosity at a frequency of 0.1 rad/sec to that at frequency of 100 rad/sec.

Mooney Large Viscosity (ML) and Mooney Relaxation Area (MLRA):

ML and MLRA were measured using a Mooney viscometer according to ASTM D-1646, modified as detailed in the following description. A square sample was placed on either side of the rotor of the Mooney viscometer. The cavity was filled by pneumatically lowering the upper platen. The upper and lower platens were electrically heated and controlled at 125° C. The torque required to turn the rotor at 2 rpm was measured by a torque transducer. The Mooney viscometer was operated at an average shear rate of 2 s$^{-1}$. The sample was pre-heated for 1 minute after the platens were closed. The motor was then started and the torque was recorded for a period of 4 minutes. The results are reported as ML (1+4) at 125° C., where M is the Mooney viscosity number, L denotes large rotor, 1 is the pre-heat time in minutes, 4 is the sample run time in minutes after the motor starts, and 125° C. is the test temperature.

The torque limit of a Mooney viscometer is about 100 Mooney units. Mooney viscosity values greater than about 100 Mooney units cannot generally be measured under these conditions. In this event, a non-standard rotor design is employed with a change in the Mooney scale, which allows the same Mooney viscometer instrumentation to be used for more viscous polymers. The modified rotor that is both smaller in diameter and thinner than the standard Mooney Large (ML) rotor is termed MST (Mooney Small Thin). Typically when an MST rotor is employed, the test is also run over a different time and at a different temperature. For example, the pre-heat time is changed from the standard 1 minute to 5 minutes and the test is run at 200° C. instead of the standard 125° C. Thus, the Mooney viscosity value reported under these conditions is MST (5+4) at 200° C. The run time of 4 minutes at the end of which the Mooney viscosity reading is taken remains the same as for measurements made under standard conditions. According to EP 1 519 967, incorporated herein by reference, one MST point is approximately 5 ML points when MST is measured at (5+4@200° C.) and ML is measured at (1+4@125° C.).

Preparation of the MST rotor may take place as follows:
a. The rotor has a diameter of 30.48+/−0.03 mm and a thickness of 2.8+/−0.03 mm (tops of serrations) and a shaft of 11 mm or less in diameter.
b. The rotor should have a serrated face and edge, with square grooves of 0.8 mm width and a depth of 0.25-0.38 mm cut on 1.6 mm centers. The serrations include two sets of grooves at right angles to each other (form a square crosshatch).
c. The rotor is positioned in the center of the die cavity such that the centerline of the rotor disk coincides with the centerline of the die cavity to within a tolerance of +/−0.25 mm. A spacer or a shim may be used to raise the shaft to the midpoint.
d. The wear point (cone shaped protuberance located at the center of the top face of the rotor) is machined off flat with the face of the rotor.

The MLRA data was obtained from the Mooney viscosity measurement when the rubber relaxes once the rotor has been stopped. The MLRA was calculated as the integrated area under the Mooney torque-relaxation time curve from 1 to 100 seconds. The MLRA is a measure of chain relaxation in molten polymer and can be regarded as a stored energy term, which suggests that, after the removal of an applied strain, the longer or branched polymer chains can store more energy and require a longer time to relax. Therefore, the MLRA value of a rubber having a bimodal molecular weight distribution or a long chain branched rubber is larger than that of a rubber having a broad or a narrow molecular weight distribution when compared at the same Mooney viscosity values.

Mooney Relaxation Area is dependent on the Mooney viscosity of the polymer, and increases with increasing Mooney viscosity. In order to remove the dependence on polymer Mooney Viscosity, a corrected MLRA (cMLRA) parameter is used, where the MLRA of the polymer is normalized to a reference of 80 Mooney viscosity. The formula for cMLRA is provided below in Equation 3, $$cMLRA = MLRA\left(\frac{80}{ML}\right)^{1.44} \quad \text{Equation 3}$$

where MLRA and ML are the Mooney Relaxation Area and the Mooney viscosity of the polymer sample measured at 125° C.

Molecular Weight and Composition Distribution as Measured by GPC-IR:

Unless otherwise indicated, the distribution and the moments of molecular weight (e.g., Mn, Mw, Mz) and the comonomer distribution ($C_2$, $C_3$, $C_6$, etc.) were determined with a high temperature Gel Permeation Chromatography (PolymerChar GPC-IR) system equipped with a multiple-channel band filter infrared detector ensemble IR5. In this detector, a broad-band channel is used to measure the polymer concentration while two narrow-band channels are used for characterizing composition. Three Agilent PLgel 10 μm Mixed-B LS columns were used to provide polymer separation. Aldrich reagent grade 1,2,4-trichlorobenzene (TCB) with 300 ppm antioxidant butylated hydroxytoluene (BHT) was used as the mobile phase. The TCB mixture was filtered through a 0.1 micron Teflon filter and degassed with an online degasser before entering the GPC instrument. The nominal flow rate was 1.0 mL/min and the nominal injection volume was 200 microliters. The whole system including transfer lines, columns, and detectors was contained in an oven maintained at 145° C. A given amount of polymer sample was weighed and sealed in a standard vial with 80 microliters of flow marker (heptane) added to it. After loading the vial in the auto-sampler, the polymer was automatically dissolved in the instrument with 8 mL of added TCB solvent. The polymer was dissolved at 160° C. with continuous shaking for about 1 hour for most PE samples or about 2 hours for PP samples. The TCB densities used in concentration calculations were 1.463 g/mL at room temperature and 1.284 g/mL at 145° C. The sample solution concentration was from 0.2 to 2.0 mg/mL, with lower concentrations being used for higher molecular weight samples.

The concentration, c, at each point in the chromatogram was calculated from the baseline-subtracted IR5 broadband signal, I, using Equation 4, $$c = \beta I \qquad \text{Equation 4}$$

where β is the mass constant determined with PE standard NBS1475. The mass recovery was calculated from the ratio of the integrated area of the concentration chromatograph over the elution volume and the injection mass, which is equal to the pre-determined concentration multiplied by injection loop volume.

Molecular weight was determined by combining a universal calibration relationship with the column calibration, which was performed with a series of mono-dispersed polystyrene (PS) standards. The molecular weight was calculated at each elution volume using Equation 5, $$\log M_X = \frac{\log(K_X/K_{PS})}{a_X + 1} + \frac{a_{PS} + 1}{a_X + 1} \log M_{PS} \qquad \text{Equation 5}$$

where K and a are the coefficients in the Mark-Houwink equation. Concentrations are expressed in g/cm³, molecular weight is expressed in g/mole, and intrinsic viscosity (K in the Mark-Houwink equation) is expressed in dL/g unless otherwise noted. The variables with subscript "X" stand for the test sample while those with subscript "PS" stand for polystyrene. In this method, $a_{PS}=0.67$ and $K_{PS}=0.00017$ while $a_X$ and $K_X$ are determined based on the composition of linear ethylene/propylene copolymers and linear ethylene-propylene-diene monomer terpolymers using a standard calibration procedure (see Sun, T. et al. *Macromolecules* 2001, 34, 6812). The comonomer composition was determined from the ratio of the IR detector intensity corresponding to $CH_2$ and $CH_3$ channel calibrated with a series of PE and PP homo/copolymer standards whose nominal values were predetermined by NMR.

The LS detector is the 18-angle Wyatt Technology High Temperature DAWN HELEOSII. The LS molecular weight (M) at each point in the chromatogram is determined by analyzing the LS output using the Zimm model for static light scattering and Equation 6 (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c \qquad \text{Equation 6}$$

where ΔR(θ) is the measured excess Rayleigh scattering intensity at scattering angle θ, c is the polymer concentration determined from the IR5 analysis, A2 is the second virial coefficient, P(θ) is the form factor for a monodisperse random coil, and $K_o$ is the optical constant for the system, as calculated in Equation 7

$$K_o = \frac{4\pi^2 n^2 (dn/dc)^2}{\lambda^4 N_A} \qquad \text{Equation 7}$$

where $N_A$ is Avogadro's number and (dn/dc) is the refractive index increment for the system. The refractive index is n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the equation $[\eta]=\eta_s/c$, where c is concentration and is determined from the IR5 broadband channel output. The viscosity MW at each point is calculated using Equation 8

$$M = K_{PS} M^{\alpha_{PS}+1}/[\eta] \qquad \text{Equation 8}$$

where $\alpha_{ps}$ is 0.67 and $K_{PS}$ is 0.000175.

The branching index ($g'_{vis}$) is calculated using the output of the GPC-IR5-LS-VIS method as follows. The average intrinsic viscosity, $[\eta]_{avg}$, of the sample is calculated using Equation 9

$$[\eta]_{avg} = \frac{\sum c_i [\eta]_i}{\sum c_i} \qquad \text{Equation 9}$$

where the summations are over the chromatographic slices, i, between the integration limits.

The branching index $g'_{vis}$ is defined as using Equation 10

$$g'_{vis} = \frac{[\eta]_{avg}}{K M_v^\alpha} \qquad \text{Equation 10}$$

where Mv is the viscosity-average molecular weight based on molecular weights determined by LS analysis and the K and a are for the reference linear polymer, which are, for purposes of the present disclosure, α=0.695 and K=0.000579 for linear ethylene polymers, α=0.705 and K=0.0002288 for linear propylene polymers, α=0.695 and K=0.000181 for linear butene polymers, a is 0.695 and K is 0.000579*(1−0.0087*w2b+0.000018*(w2b)^2) for ethylene-butene copolymer where w2b is a bulk weight percent of butene comonomer, a is 0.695 and K is 0.000579*(1−0.0075*w2b) for ethylene-hexene copolymer where w2b is a bulk weight percent of hexene comonomer, and a is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules,* 2001, Vol. 34(19), pp. 6812-6820).

Ethylene content was determined using FTIR according to ASTM D3900 and was not corrected for diene monomer content. ENB (diene monomer) was determined using FTIR according to ASTM D6047. The content of other diene monomers can be obtained using $^{13}$C nuclear magnetic resonance (NMR) spectroscopy.

The comonomer content and sequence distribution of the polymers can be measured using $^{13}$C NMR. U.S. Pat. No. 6,525,157, incorporated herein by reference in its entirety, contains more details of the determination of ethylene content by NMR. Comonomer content of discrete molecular weight ranges can be measured using methods such as Fourier Transform Infrared Spectroscopy (FTIR) in conjunction with samples by GPC, as described in Wheeler and Willis, Applied Spectroscopy, 1993, pp. 1128-1130, 47. For propylene-ethylene copolymer containing 40 to 70 wt. % ethylene, the ethylene content was measured using FTIR according to the following technique. A thin homogeneous film of polymer was pressed at a temperature of about 150° C. or greater, and mounted on a Perkin Elmer PE 2000 infrared spectrophotometer. A full spectrum of the sample from 600 cm$^{-1}$ to 4000 cm$^{-1}$ was recorded and the ethylene weight percent was calculated according to Equation 11, $$\text{Ethylene wt. \%} = 82.585 - 111.987x + 30.045x^2 \quad \text{Equation 11}$$

where x is the ratio of the peak height at ~1155 cm$^4$ and peak height at either ~722 cm$^{-1}$ or ~732 cm$^{-1}$, whichever is higher.

Peak melting point, Tm (also referred to as melting point), peak crystallization temperature, Tc (also referred to as crystallization temperature), glass transition temperature (Tg), heat of fusion (ΔHf or Hf), and percent crystallinity were determined using the following DSC procedure according to ASTM D3418-03. Differential scanning calorimetric (DSC) data were obtained using a TA Instruments model Q200 calorimeter. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isotherm for 2 minutes and heating to 200° C. at 10° C./minute. Both the first and second cycle thermal events were recorded. Areas under the endothermic peaks were measured and used to determine the heat of fusion and the percent of crystallinity. The percent crystallinity was calculated using Equation 12, $$[\text{area under the melting peak(Joules/gram)}/B(\text{Joules/gram})]*100 \quad \text{Equation 12}$$

where B is the heat of fusion for the 100% crystalline homopolymer of the major monomer component. These values for B were, for example, obtained from the Polymer Handbook, Fourth Edition, published by John Wiley and Sons, New York 1999, provided that a B value of 189 J/g is used as the heat of fusion for 100% crystalline polypropylene and a B value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity was calculated using the sum of heats of fusion from all endothermic peaks. Some of the polymer blends showed a secondary melting/cooling peak overlapping with the principal peak, which peaks are considered together as a single melting/cooling peak. The highest of these peaks was considered the peak melting temperature/crystallization point. For amorphous polymers with comparatively low levels of crystallinity, the melting temperature was typically measured and reported during the first heating cycle. Prior to the DSC measurement, the sample was aged (typically by holding it at ambient temperature for a period of 2 days) or annealed to maximize the level of crystallinity.

The fraction of oil (low molecular weight polyolefin) in a blend with a high molecular weight polyolefin was determined using Soxhlet extraction. The polymer blend was placed in a paper thimble and extracted in a Soxhlet apparatus with an azeotrope of acetone and cyclohexane in a ratio of 2:1 by volume as the solvent. Reflux was maintained for 24 hours. After evaporation of the solvent from the residue, the weight loss by the sample was determined, with the weight loss corresponding to azeotrope-soluble materials. For polyolefin compositions with a relatively high molecular weight, the fraction of the first polymer was determined using best fit of two Flory distributions to the molecular weight distribution curve obtained from GPC-IR.

Polymerization Examples 1-14

Oil extended ethylene copolymers (Polymer Blends 1-14 in Table 1 below) were prepared in a solution polymerization process conducted in a continuous stirred-tank reactor system, as described further below.

Isohexane (used as solvent) and monomers (e.g., ethylene, propylene and/or ENB) were purified over beds of alumina and molecular sieves. Toluene for preparing catalyst solutions was purified by the same technique. Tri-n-octylaluminum (25 wt. % in hexanes, Sigma Aldrich) was further diluted with isohexane and used as a scavenger solution. The feed rate of the scavenger solution was adjusted to maximize catalyst efficiency.

The catalyst used for the production of low molecular weight polymer (oil extension) was cyclotetramethylenesilylene-bis(4,7-dimethylinden-1-yl)hafnium dimethyl (Catalyst #1), which was activated with N,N-dimethylanilinium tetrakis(heptafluoro-2-naphthyl) borate. The catalyst used for production of high molecular weight polymer was (QDA-1)HfMe2 (see Formula 4 above, Catalyst #2), which was pre-activated with N,N-dimethylanilinium tetrakis(pentafluorophenyl) borate. Both catalysts were pre-activated with the chosen activator at a molar ratio of 1:1 in 900 mL of toluene. All catalyst solutions were kept in an inert atmosphere and fed into the reactor using an ISCO syringe pump.

Polymerizations were carried out in a continuous stirred-tank reactor system under solution polymer conditions. A one liter autoclave reactor was equipped with a stirrer, a pressure controller, and a water cooling/steam heating element with a temperature controller. The reactor was operated in a liquid fill condition at a pressure in excess of the bubbling point pressure of the reaction mixture, thereby keeping the reactants in a liquid phase. Isohexane and propylene were pumped toward the reactor by Pulsa feed pumps. Ethylene was fed toward the reactor through a Brooks flow controller as a gas under their own pressure. All liquid flow rates were controlled using Coriolis mass flow controllers (Quantim series from Brooks). Monomers (e.g., ethylene, propylene, and/or ENB) and $H_2$ feeds were combined into one stream, which was mixed with an isohexane stream that had been pre-cooled to at least 0° C. The resulting mixture was then fed to the reactor through a single line. The scavenger solution was added to the combined solvent/monomer stream just before it entered the reactor to further reduce any catalyst poisons. Similarly, the catalyst solutions were fed to the reactor using an ISCO syringe pump through a separate line.

The scavenger feed rate was adjusted to optimize the catalyst efficiency, with the feed rate varying from 0 (no scavenger) to 15 μmol/min. The catalyst feed rates were adjusted according to the level of impurities in the system to reach targeted conversions. All the reactions were carried out at a pressure of about 2.4 MPa/g unless otherwise mentioned.

The polymer produced in the reactor exited the reactor in solution through a back pressure control valve, which reduced the pressure to atmospheric levels. Depressurization caused the unconverted monomers in the solution to flash into a vapor phase which was vented from the top of a vapor-liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The oven-dried samples were weighed to obtain yields.

Additional processing conditions and the properties of the polymer blends produced are included below in Table 1. The reaction pressure was 350 psi unless otherwise noted. If no value was determined for a given parameter, ND (not determined) is indicated in the Table.

TABLE 1

| Polymer Blend # | 1 | 2 | 3 | 4 | 5 |
| --- | --- | --- | --- | --- | --- |
| Polymerization Temperature (° C.) | 120 | 120 | 110 | 110 | 120 |
| Ethylene Feed Rate (g/min) | 4.5 | 4.5 | 4.5 | 4.5 | 4.5 |
| Propylene Feed Rate (g/min) | 6.0 | 6.0 | 6.0 | 6.0 | 6.0 |
| ENB Feed Fate (g/min) | 0 | 0 | 0 | 0 | 0 |
| Isohexane Feed Rate (g/min) | 56.7 | 56.7 | 56.7 | 56.7 | 56.7 |
| Catalyst #2 Feed Rate (mol/min) | 9.711E−08 | 7.283E−08 | 2.428E−08 | 1.821E−08 | 9.711E−08 |
| Catalyst #1 Feed Rate (mol/min) | 3.081E−08 | 4.621E−08 | 7.701E−09 | 1.155E−08 | 1.540E−08 |
| Mole Ratio Catalyst 2:Catalyst 1 | 3.15 | 1.58 | 3.15 | 1.58 | 6.31 |
| Yield (g/min) | 7.6 | 7.3 | 5.9 | 5.5 | 7.1 |
| Conversion (%) | 71.9 | 69.0 | 55.9 | 52.4 | 67.0 |
| Ethylene Content (wt. %) | 54.4 | 54.6 | 63.8 | 64.6 | 56.3 |
| ENB Content (wt. %) | 0 | 0 | 0 | 0 | 0 |
| Complex Viscosity @ 0.1 rad/s | 2,688,718 | 2,784,590 | 2,673,995 | 2,684,338 | 2,469,176 |
| Complex Viscosity @ 0.245 rad/s | 1,348,095 | 1,322,480 | 1,404,502 | 1,353,783 | 1,274,823 |
| Complex Viscosity @ 128 rad/s | 6,079 | 5,440 | 7,133 | 6,609 | 6,883 |
| Shear Thinning Index | 0.998 | 0.998 | 0.997 | 0.998 | 0.997 |
| Tan Delta @ 0.245 rad/s | 0.459 | 0.388 | 0.531 | 0.460 | 0.581 |
| Phase Angle @ G* = 100k (degree) | ND | ND | ND | ND | ND |
| Phase Angle @ G* = 500k (degree) | 17.8 | 16.4 | 22.4 | 19.6 | 22.8 |
| ML (MU) | −92.94 | −108.4 | ND | ND | ND |
| MLRA (MU-sec) | −4,588 | −3,928 | ND | ND | ND |
| cMLRA (MU) | −3,697 | −2,538 | ND | ND | ND |
| MST (MU) |  | 59.7 | 74.4 | 67.7 | 61.3 |
| MSTRA (MU-sec) |  | 546 | 589 | 633 | 342 |
| Mn_IR (g/mol) | 25,950 | 19,544 | 49,112 | 42,779 | ND |
| Mw_IR (g/mol) | 406,269 | 366,130 | 442,839 | 419,511 | ND |
| Mz_IR (g/mol) | 794,318 | 736,924 | 877,785 | 889,012 | ND |
| Mn_LS (g/mol) | 29,538 | 23,889 | 55,953 | 51,471 | ND |
| Mw_LS (g/mol) | 464,066 | 414,298 | 486,985 | 468,779 | ND |
| Mz_LS (g/mol) | 803,230 | 726,845 | 782,770 | 809,511 | ND |
| g'vis | 0.949 | 0.974 | 1.011 | 1.003 | ND |

TABLE 1-continued

| Polymer Blend # | 6 | 7 | 8 | 9 | 10 |
|---|---|---|---|---|---|
| Polymerization Temperature (° C.) | 120 | 110 | 110 | 120 | 120 |
| Ethylene Feed Rate (g/min) | 4.5 | 4.5 | 4.5 | 4.5 | 4.5 |
| Propylene Feed Rate (g/min) | 6.0 | 6.0 | 6.0 | 6.0 | 6.0 |
| ENB Feed Rate (g/min) | 0 | 0 | 0 | 0 | 1.78 |
| Isohexane Feed Rate (g/min) | 56.7 | 56.7 | 56.7 | 56.7 | 56.7 |
| Catalyst #2 Feed Rate (mol/min) | 1.092E−07 | 2.428E−08 | 2.731E−08 | 1.457E−07 | 1.942E−07 |
| Catalyst #1 Feed Rate (mol/min) | 7.701E−09 | 7.701E−09 | 1.925E−09 | 2.310E−08 | 3.081E−08 |
| Mole Ratio Catalyst 2:Catalyst 1 | 14.2 | 3.15 | 14.2 | 6.31 | 6.31 |
| Yield (g/min) | 7.2 | 5.3 | 5.7 | 7.9 | 4.2 |
| Conversion (%) | 68.7 | 50.5 | 54.1 | 75.5 | 39.4 |
| Ethylene Content (wt. %) | 56.4 | 66.9 | 65.8 | 51.9 | 70.8 |
| ENB Content (wt. %) | 0 | 0 | 0 | 0 | 7.5 |
| Complex Viscosity @ 0.1 rad/s | 2,169,816 | 2,719,539 | 2,735,808 | 1,865,593 | 540,023 |
| Complex Viscosity @ 0.245 rad/s | 1,191,940 | 1,516,548 | 1,607,526 | 989,816 | 302,978 |
| Complex Viscosity @ 128 rad/s | 7,352 | 8,204 | 8,383 | 5,993 | 3,239 |
| Shear Thinning Index | 0.997 | 0.997 | 0.997 | 0.997 | 0.994 |
| Tan Delta @ 0.245 rad/s | 0.705 | 0.722 | 0.709 | 0.605 | 0.778 |
| Phase Angle @G* = 100k (degree) | ND | ND | ND | ND | 35.7 |
| Phase Angle @G* = 500k (degree) | 25.9 | 30.6 | 30.3 | 21.3 | ND |
| ML (MU) | ND | ND | ND | 70.4 | 68.3 |
| MLRA (MU-sec) | ND | ND | ND | 647.8 | 488.9 |
| cMLRA (MU) | ND | ND | ND | 778.7 | 613.9 |
| MST (MU) | −70.8 | −94.4 | −96.4 | ND | ND |
| MSTRA (MU-sec) | −401 | −682 | −649 | ND | ND |
| Mn_IR (g/mol) | ND | ND | ND | ND | ND |
| Mw_IR (g/mol) | ND | ND | ND | ND | ND |
| Mz_IR (g/mol) | ND | ND | ND | ND | ND |
| Mn_LS (g/mol) | ND | ND | ND | ND | ND |
| Mw_LS (g/mol) | ND | ND | ND | ND | ND |
| Mz_LS (g/mol) | ND | ND | ND | ND | ND |
| g'vis | ND | ND | ND | ND | ND |

| Polymer Blend # | 11 | 12 | 13 | 14 |
|---|---|---|---|---|
| Polymerization Temperature (° C.) | 120 | 120 | 120 | 120 |
| Ethylene Feed Rate (g/min) | 4.5 | 4.5 | 4.5 | 4.5 |
| Propylene Feed Rate (g/min) | 6.0 | 6.0 | 6.0 | 6.0 |
| ENB Feed Rate (g/min) | 2.67 | 0 | 0.89 | 1.78 |
| Isohexane Feed Rate (g/min) | 56.7 | 56.7 | 56.7 | 56.7 |
| Catalyst #2 Feed Rate (mol/min) | 2.428E−07 | 1.457E−07 | 2.913E−07 | 2.913E−07 |
| Catalyst #1 Feed Rate (mol/min) | 3.851E−08 | 2.310E−08 | 4.621E−08 | 4.621E−08 |
| Mole Ratio Catalyst 2:Catalyst 1 | 6.30 | 6.31 | 6.30 | 6.30 |
| Yield (g/min) | 4.1 | 8.3 | 5.8 | 4.8 |
| Conversion (%) | 39.1 | 78.9 | 55.4 | 45.7 |
| Ethylene Content (wt. %) | 73.3 | 50.0 | 62.9 | 68.7 |
| ENB Content (wt. %) | 10.6 | 0 | 4.8 | 6.4 |
| Complex Viscosity @ 0.1 rad/s | 648,938 | 1,719,915 | 1,388,286 | 1,250,070 |
| Complex Viscosity @ 0.245 rad/s | 356,912 | 927,115 | 755,015 | 684,942 |
| Complex Viscosity @ 128 rad/s | 3,303 | 6,187 | 5,450 | 5,180 |
| Shear Thinning Index | 0.995 | 0.996 | 0.996 | 0.996 |
| Tan Delta @ 0.245 rad/s | 0.707 | 0.642 | 0.644 | 0.666 |
| Phase Angle @G* = 100k (degree) | 34.2 | ND | ND | ND |
| Phase Angle @G* = 500k (degree) | ND | 22.4 | 19.3 | 18.6 |

TABLE 1-continued

| | | | | |
|---|---|---|---|---|
| ML (MU) | 133.6 | ND | ND | ND |
| MLRA (MU-sec) | 2162.1 | ND | ND | ND |
| cMLRA (MU) | 1033.2 | ND | ND | ND |
| MST (MU) | ND | −56.3 | −41 | −36.1 |
| MSTRA (MU-sec) | ND | −413 | −221 | −202 |
| Mn_IR (g/mol) | ND | ND | ND | ND |
| Mw_IR (g/mol) | ND | ND | ND | ND |
| Mz_IR (g/mol) | ND | ND | ND | ND |
| Mn_LS (g/mol) | ND | ND | ND | ND |
| Mw_LS (g/mol) | ND | ND | ND | ND |
| Mz_LS (g/mol) | ND | ND | ND | ND |
| g'vis | ND | ND | ND | ND |

FIG. 1 shows a GPC 4D analysis of Polyolefin Blend 2 obtained as above. As shown, the high molecular weight polymer was obtained as the majority component, and there was good separation between the molecular weights of the high molecular weight polymer and the low molecular weight polymer.

Figure 2:
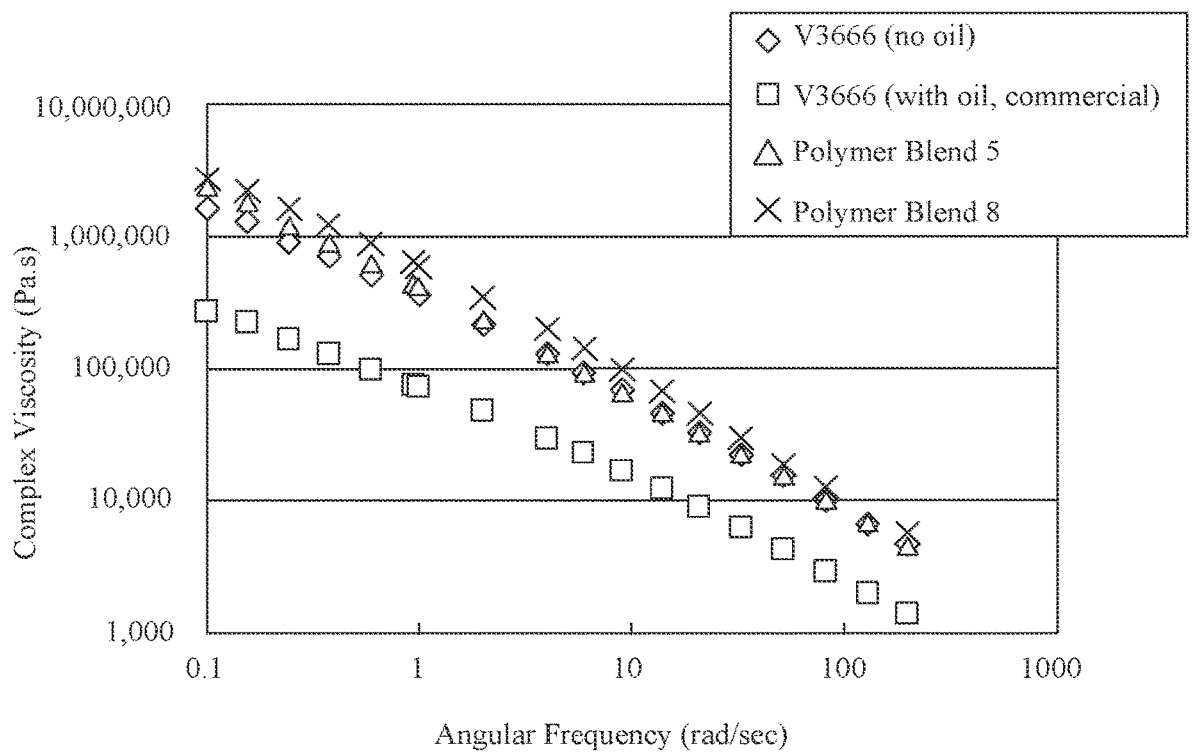
FIGS. 2 and 3 show plots of illustrative rheological performance for Polyolefin Blends 5 and 8 produced in the Examples.
Figure 3:
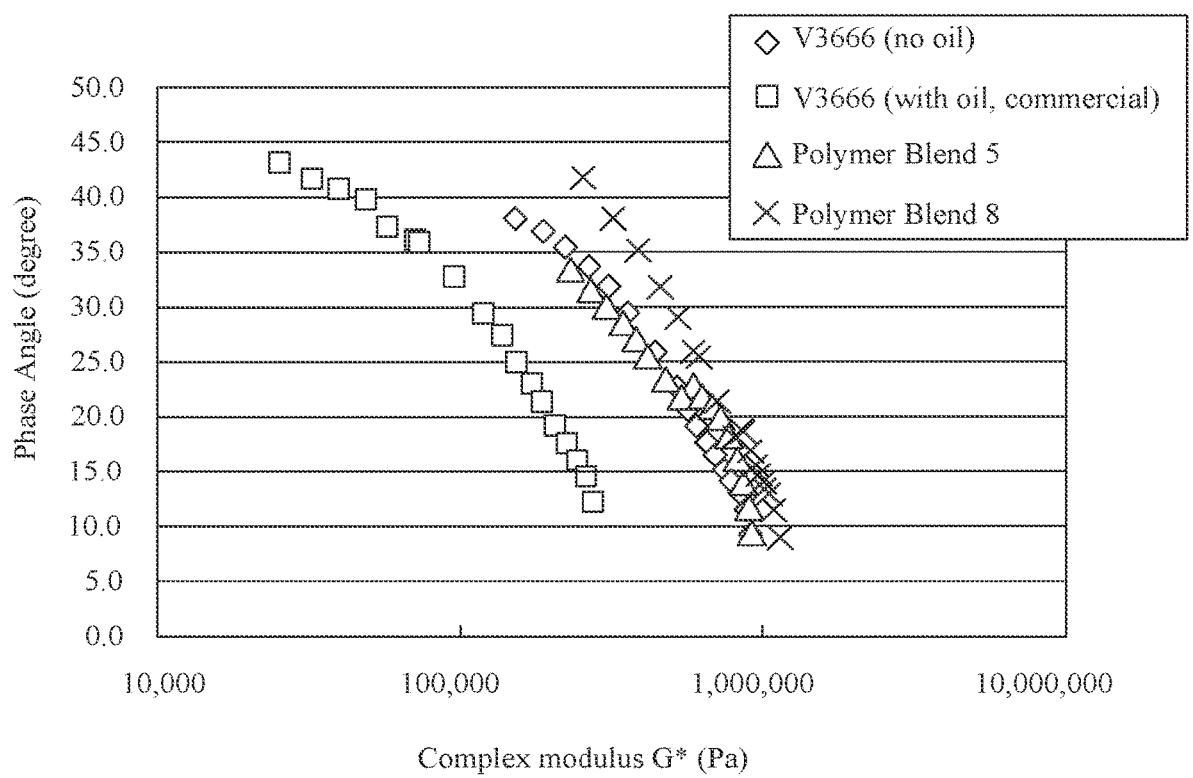

FIGS. 2 and 3 show plots of rheological data for selected Polyolefin Blends from above, specifically Polyolefin Blends 5 and 8. As shown, Polyolefin Blends 5 and 8 exhibited similar rheological characteristics and were superior to those of commercial V3666, which is an EPDM polymer formulated with a conventional oil extension. A sample of V3666 obtained without the oil extension had comparable rheological characteristics to Polymer Blends 5 and 8. Thus, the rheological data shows that the rheological performance of EPDM can be enhanced by incorporating a low molecular weight polymer therein, while still realizing the processing advantages discussed above.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A method comprising:
   combining a reaction mixture comprising:
   one or more olefinic monomers,
   a first catalyst component comprising a metallocene and a second catalyst component comprising at least one non-metallocene transition metal complex selected from the group consisting of a pyridylbisimine complex, a quinolinyldiamido complex, a pyridylamido complex, a phenoxyimine complex, a bridged bi-aromatic complex, and any combination thereof, wherein a molar ratio of the second catalyst component to the first catalyst component ranges from about 3:1 to about 15:1, and a solvent; and reacting the one or more olefinic monomers under solution polymerization conditions to form a polyolefin blend comprising a first polyolefin and a second polyolefin, the polyolefin blend exhibits a bimodal molecular weight distribution and the second polyolefin has a higher weight average molecular weight than the first polyolefin, wherein the second polyolefin has a weight average molecular weight of about 150,000 or higher and the first polyolefin has a weight average molecular weight of about 50,000 or lower.

2. The method of claim 1, wherein the first catalyst component promotes formation of the first polyolefin and the second catalyst component promotes formation of the second polyolefin.

3. The method of claim 1, wherein the second catalyst component is a quinolinyldiamido complex.

4. The method of claim 3, wherein the second catalyst component is a Hf or Zr quinolinyldiamido complex.

5. The method of claim 1, wherein the second catalyst component is a Group 4 quinolinyldiamido complex.

6. The method of claim 1, wherein the molar ratio of the second catalyst component to the first catalyst component ranges from about 3:1 to about 10:1.

7. The method of claim 1, wherein the reaction mixture further comprises one or more activators.

8. The method of claim 7, wherein the one or more activators are selected from the group consisting of an alumoxane and a non-coordinating anion activator.

9. The method of claim 7, wherein the reaction mixture further comprises at least one alkylaluminum compound.

10. The method of claim 1, wherein the solvent comprises at least one hydrocarbon solvent.

11. The method of claim 1, wherein the one or more olefinic monomers comprise at least ethylene and propylene.

12. The method of claim 1, wherein the one or more olefinic monomers comprise ethylene, propylene, and a diene monomer.

13. The method of claim 1, wherein the reaction mixture is combined and reacted in a single reactor vessel to form the polyolefin blend.

14. The method of claim 1, further comprising:
obtaining the polyolefin blend in a solution comprising the solvent.

15. The method of claim 1, further comprising:
separating the polyolefin blend from the solvent to provide a substantially solvent-free polyolefin blend.

16. The method of claim 1, wherein the first polyolefin has a weight average molecular weight ranging from about 10,000 to about 40,000.

17. The method of claim 1, wherein the polyolefin blend comprises a higher mass percentage of the second polyolefin than the first polyolefin.

18. The method of claim 1, wherein the polyolefin blend comprises about 20 wt. % to about 40 wt. % of the first polyolefin and about 60 wt. % to about 80 wt. % of the second polyolefin.

19. The method of claim 1, wherein the bimodal molecular weight distribution exhibits a peak-to-peak molecular weight separation that is at least two orders of magnitude.

20. The method of claim 1, further comprising:
selecting an amount of the first catalyst component sufficient to provide a substantially solvent-free polyolefin blend having a Mooney viscosity ML (1+4) about 50 MU or more, as measured using a Mooney viscometer.

21. The method of claim 1, wherein the polyolefin blend has a Mooney viscosity ML (1+4) of about 50 MU to about 150 MU, as measured using a Mooney viscometer.

* * * * *